(12) United States Patent
Follen et al.

(10) Patent No.: US 10,393,195 B2
(45) Date of Patent: Aug. 27, 2019

(54) OPTIMIZATION OF CONCURRENT OPERATION OF PREDICTIVE CRUISE CONTROL AND IDLE COAST MANAGEMENT CONTROL

(71) Applicant: Cummins Inc., Columbus, IN (US)

(72) Inventors: Kenneth M. Follen, Greenwood, IN (US); Vivek Anand Sujan, Columbus, IN (US); Daniel Reed Dempsey, Columbus, IN (US); Tejas Shrikant Kinjawadekar, Pune (IN); Craig Michael Calmer, Hope, IN (US); Jairo Andres Sandoval Leon, Columbus, IN (US); Oruganti Prashanth Sharma, Moutain View, CA (US)

(73) Assignee: Cummins Inc., Columbus, IN (US)

( * ) Notice: Subject to any disclaimer, the term of this patent is extended or adjusted under 35 U.S.C. 154(b) by 67 days.

(21) Appl. No.: 15/842,951

(22) Filed: Dec. 15, 2017

(65) Prior Publication Data

US 2019/0186561 A1 Jun. 20, 2019

(51) Int. Cl.
*F16D 48/06* (2006.01)

(52) U.S. Cl.
CPC ........ *F16D 48/06* (2013.01); *B60Y 2300/143* (2013.01); *F16D 2500/10412* (2013.01); *F16D 2500/3108* (2013.01); *F16D 2500/3124* (2013.01); *F16D 2500/70494* (2013.01)

(58) Field of Classification Search
None
See application file for complete search history.

(56) References Cited

U.S. PATENT DOCUMENTS

| | | | |
|---|---|---|---|
| 8,498,795 B2 | 7/2013 | Eriksson et al. |
| 8,626,424 B2 | 1/2014 | Schwalm et al. |
| 8,666,630 B2 | 3/2014 | Bjernetun et al. |
| 8,788,174 B2 | 7/2014 | Bjernetun et al. |
| 2011/0040467 A1 | 2/2011 | Breuer |
| 2013/0253797 A1 | 9/2013 | McNew |
| 2013/0297174 A1 | 11/2013 | Lacaze et al. |
| 2014/0067225 A1 | 3/2014 | Lee et al. |

FOREIGN PATENT DOCUMENTS

| | | |
|---|---|---|
| JP | 2015116871 | 6/2015 |
| WO | 2016007071 | 1/2016 |

*Primary Examiner* — Timothy Hannon
(74) *Attorney, Agent, or Firm* — Taft Stettinius & Hollister LLP

(57) ABSTRACT

A powertrain including a prime mover and an electronically controllable clutch. The powertrain structured selectably engages the clutch to provide power from the prime mover to drive one or more ground contacting wheels and to selectably disengage the clutch to decouple with one or more ground contacting wheels. The electronic control system operatively communicates with the prime mover and the electronically controllable clutch, and uses a predictive cruise control (PCC) controller and an idle coast management (ICM) controller, to control vehicle speed during concurrent operation of the PCC controller and the ICM controller.

20 Claims, 14 Drawing Sheets

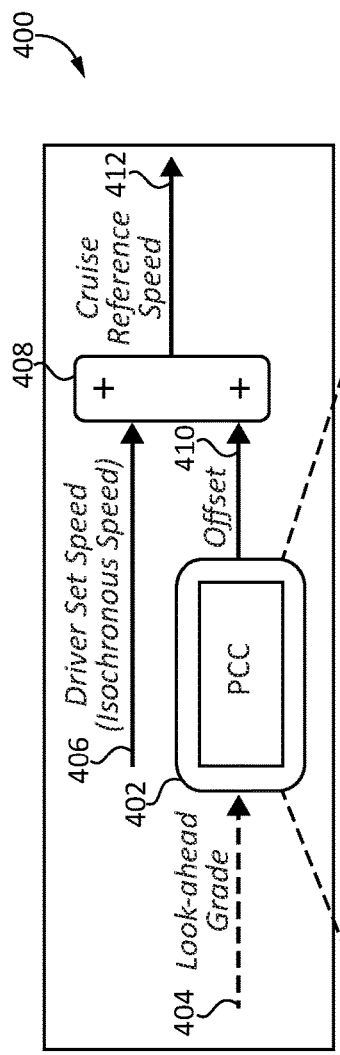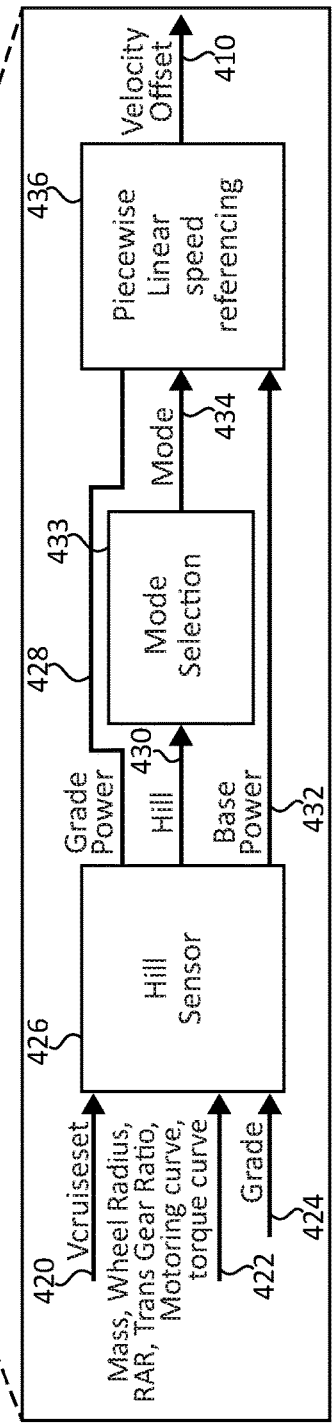
Fig. 4A
Fig. 4B

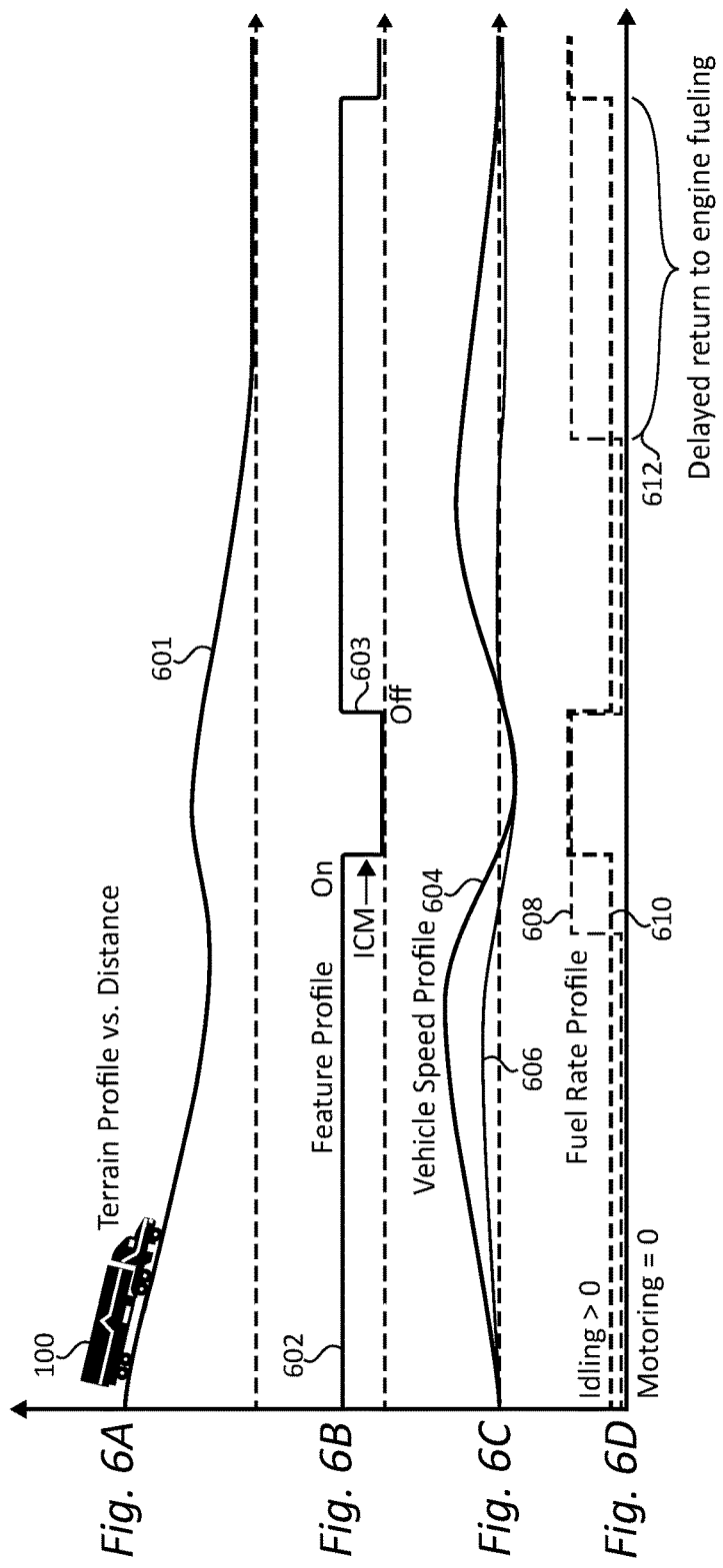

OPTIMIZATION OF CONCURRENT OPERATION OF PREDICTIVE CRUISE CONTROL AND IDLE COAST MANAGEMENT CONTROL

BACKGROUND

The present application relates to optimization of concurrent operation of predictive cruise control and idle coast management control. Predictive cruise control (sometimes referred to herein as "PCC") generally refers to a class of controls which are configured to provide variation in a cruise control vehicle speed set point based on current or look ahead vehicle mission parameters in order to reduce fuel consumption or increase fuel economy. PCC control components may reside in controllers embedded in engine control systems, transmission control systems, other vehicle control systems and combinations thereof. Idle coast management control (sometimes referred to herein as "ICM") generally refers to a class of controls which are configured to control engagement and disengagement of vehicle wheels from a vehicle prime mover such as an engine based on current or look ahead vehicle mission parameters in order to reduce fuel consumption or increase fuel economy. ICM control components may reside in controllers embedded in engine control systems, transmission control systems, other vehicle control systems and combinations thereof. A number of control systems and methods have been proposed which include PCC components and ICM components which may operate or attempt to operate concurrently. PCC and ICM control components both have the potential to reduce fuel consumption over a vehicle mission. In practice, however, the complexity of interaction between PCC and ICM controls as well as their interaction with other powertrain and vehicle system controls can surprisingly impair any fuel consumption benefits and can actually increase fuel consumption. There remains a significant need for the unique apparatuses, methods and systems disclosed herein.

DISCLOSURE OF ILLUSTRATIVE EMBODIMENTS

For the purposes of clearly, concisely and exactly describing illustrative embodiments of the present disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY OF THE DISCLOSURE

One embodiment is a unique system including optimization of concurrent operation of predictive cruise control and idle coast management control. Further embodiments, forms, objects, features, advantages, aspects, and benefits shall become apparent from the following description and drawings.

BRIEF DESCRIPTION OF THE DRAWINGS

FIGS. 4a and 4b are schematic illustrations of exemplary predictive cruise control (PCC) controls.

FIG. 6a-6d respectively illustrate a schematic of road grade over a vehicle route, an intelligent coast management (ICM) control state, a vehicle speed profile and a vehicle fueling profile.

DETAILED DESCRIPTION OF ILLUSTRATIVE EMBODIMENTS

Figure 1:
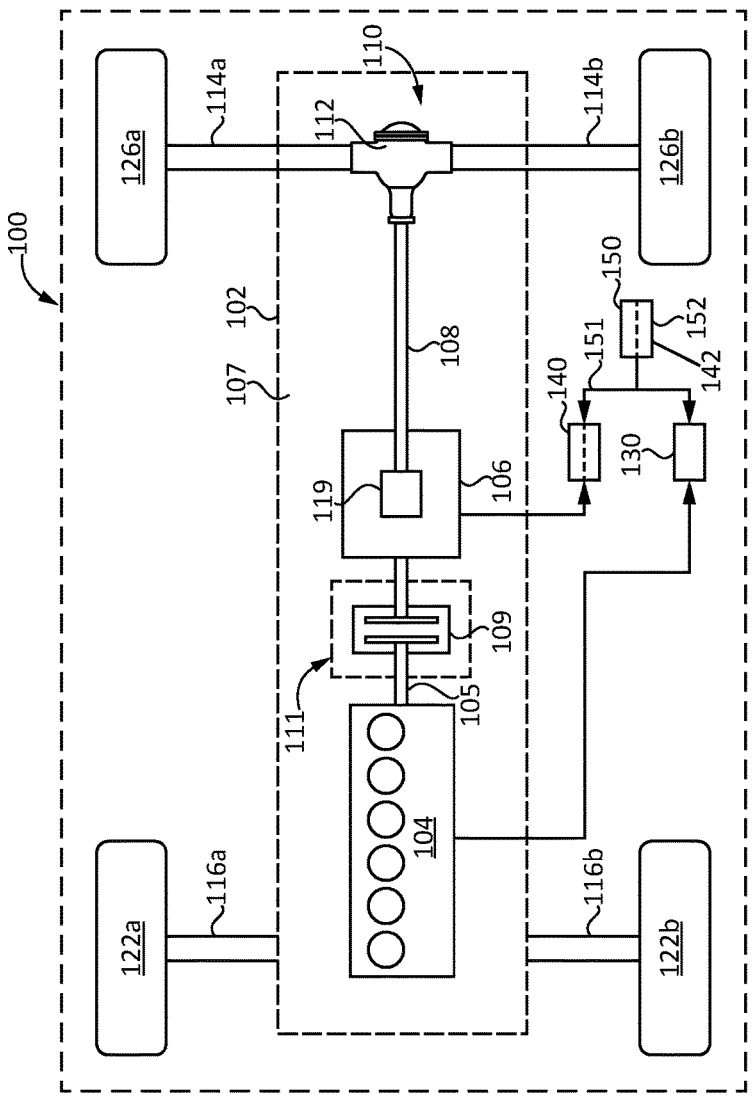
FIG. 1 is a schematic illustration of a vehicle with a predictive cruise control system and an idle coast management system for speed control and coasting management of the vehicle.

With reference to FIG. 1, there is illustrated a schematic view of an exemplary vehicle 100 including a powertrain 102 incorporated within vehicle 100. In the illustrated embodiment, the powertrain 102 includes a prime mover 104, such as an internal combustion engine, structured to generate power for the vehicle 100. The powertrain 102 further includes a transmission 106 connected to the prime mover 104 for adapting the output torque of the prime mover 104 and transmitting the output torque to a driveline 107 including drive shaft 108. In the illustrated embodiment, the transmission 106 may be disengageably connected to an engine crankshaft 105 via a clutch 109. In other embodiments, the transmission 106 may be disengageably connected to an engine crankshaft 105 and the engagement and disengagement may be by operation of a master clutch provided at the front of the transmission, by operation of the transmission to place a gear in a neutral condition, or by other clutch and/or gearing arrangements. Various embodiments contemplate that transmission 106 may be an automatic transmission, an automated manual transmission, a manual transmission or any other suitable transmission with a disconnect device 111 that is operable to selectively engage and disengage engine 104 from driveline 107.

In the rear wheel drive configuration illustrated for vehicle 100, the driveline 107 of powertrain 102 includes a final drive 110 having a rear differential 112 connecting the drive shaft 108 to rear axles 114a, 114b. It is contemplated that the components of powertrain 102 may be positioned in different locations throughout the vehicle 100. In one non-limiting example of a vehicle 100 having a front wheel drive configuration, transmission 106 may be a trans axle and final drive 110 may reside at the front of the vehicle 100, connecting front axles 116a and 116b to the engine 104 via the transaxle. It is also contemplated that in some embodiments the vehicle 100 is in an all-wheel drive configuration.

In the illustrated embodiment, vehicle 100 includes two front wheels 122a, 122b mounted to front axles 116a, 116b, respectively. Vehicle system 100 further includes two rear wheels 126a, 126b mounted to rear axles 114a, 114b, respectively. It is contemplated that vehicle 100 may have more or fewer wheels than illustrated in FIG. 1. Vehicle 100 may also include various components not shown, such as a fuel system including a fuel tank, a front differential, a braking system, a suspension, an engine intake system and an exhaust system, which may include an exhaust aftertreatment system, just to name a few examples. In certain embodiments vehicle 100 may include an electric machine and a batteries of appropriate capacity to provide a hybrid electric powertrain.

Vehicle 100 includes an electronic or engine control unit (ECU) 130, sometimes referred to as an electronic or engine control module (ECM), or the like, which is directed to regulating and controlling the operation of engine 104. A transmission control unit (TCU) 140 is illustrated in vehicle 100, which is directed to the regulation and control of transmission 106 operation. ECU 130 and TCU 140 are each in operative communication with a plurality of vehicle sensors (not shown) in vehicle 100 for receiving and transmitting operating conditions of vehicle 100, such as temperature conditions, pressure conditions, speed conditions, fuel conditions, flow conditions to and from the engine, terrain conditions, weather conditions, global positioning system (GPS) data, and vehicle mass, for example. It is contemplated that ECU 130 and TCU 140 may be integrated within the engine 104 and transmission 106, respectively.

Vehicle system 100 further includes a cycle efficiency management (CEM) controller or control unit 150, which may be directed to the control of the operations described herein and/or directed toward an intermediary control for the regulation and control of the powertrain 102 in vehicle system 100. In the illustrated embodiment, the CEM control unit is provided with a predictive cruise control (PCC) controller 142 and an idle coast management (ICM) control controller 152. In other forms one or both of the PCC controller 142 and the ICM controller 152 may be provided in a different control unit, e.g., ECU 140 or TCU 150. In the illustrated embodiment, the PCC controller and the ICM controller are provided in a common control unit. In other forms, the PCC controller and the ICM controller may be provided in separate control units in operative communication with one another.

The CEM control unit 150 is in operative communication with the ECU 130 and TCU 140. In certain embodiments, a portion or all of the of the CEM control unit 150 may be integrated within the ECU 130 or the TCU 150 or other vehicle control unit. In still other embodiments, at least the PCC controller 142 communicates with ECU 130 and/or CEM control unit 150 over a datalink 151 provided by a wired or wireless connection so that outputs of PCC controller 142 that are determined independently of CEM control unit 150 and/or ECU 130 can be provided to CEM control unit 150 and/or ECU 130.

CEM control unit 150 may further be in operative communication with one or more of the plurality of vehicle sensors in vehicle 100 for receiving and transmitting conditions of vehicle 100, such as temperature and pressure conditions, route conditions, terrain conditions, speed conditions, and weather conditions, for example. It is contemplated that at least a portion of the conditions and/or measured inputs used for interpreting signals by the CEM control unit 150 may be received from ECU 130 and/or TCU 140 and/or PCC controller 142, in addition to or alternatively to the plurality of vehicle sensors. Furthermore, the CEM control unit 150 may include one or more processors or controllers. In the illustrated embodiment, CEM control unit 150 includes an idle coast management (ICM) control controller 152.

The CEM control unit 150 and/or ECU 130 and TCU 140 includes stored data values, constants, and functions, as well as operating instructions stored on, for example, a computer readable medium. Any of the operations of exemplary procedures described herein may be performed at least partially by the CEM control unit 150. In certain embodiments, the CEM control unit 150 includes one or more controllers structured to functionally execute the operations of the controller. Further details of certain exemplary embodiments of controller operations are discussed below. Operations illustrated are understood to be exemplary only, and operations may be combined or divided, and added or removed, as well as re-ordered in whole or part, unless stated explicitly to the contrary herein.

Certain operations described herein include operations to interpret or determine one or more parameters. Interpreting or determining, as utilized herein, includes receiving values by any method, including at least receiving values from a datalink or network communication, receiving an electronic signal (e.g., a voltage, frequency, current, or pulse-width modulation (PWM) signal) indicative of the value, receiving a software parameter indicative of the value, reading the value from a memory location on a computer readable medium, receiving the value as a run-time parameter by any means known in the art, and/or by receiving a value by which the interpreted or determined parameter can be calculated, and/or by referencing a default value that is interpreted or determined to be the parameter value.

One exemplary embodiment of PCC controller 142 is configured to dynamically adjust the vehicle speed profile while the vehicle is in a cruise control mode of operation using predictive cruise control. For example, PCC controller 142 can use upcoming terrain data to optimize the vehicle speed profile to improve fuel economy. Any predictive cruise control operating methodology is contemplated herein. The CEM control unit 150 includes a cruise control governor that interfaces with PCC controller 142 and dynamically modifies the cruise control reference speed in response to inputs from the PCC controller 142. In one embodiment, CEM control unit 150 interfaces with PCC controller 142 with standard SAE communication protocols.

One exemplary embodiment of CEM control unit 150 receives a PCC state and a PCC offset from PCC controller 142, and CEM control unit 150 provides a PCC offset status, a cruise control (CC) speed, and a CC set speed to PCC controller 142. The CC set speed is the operator selected set speed, and the CC speed is the speed currently being used as the vehicle speed target by the cruise control governor. The PCC offset status is an indication from the CEM control unit 150 of whether or not the requested PCC offset is currently included in the CC speed, and the PCC state is a value from the PCC device indicating the current state of the PCC device. Finally, the PCC offset is the requested vehicle speed offset provided by the PCC controller which is to be applied to the CC set speed.

In a further embodiment, the CEM control unit 150 is configured to provide intelligent idle coast management of the vehicle by providing a disconnect command to disengage the engine 104 from the driveline 107 to provide an idle coast management (ICM) mode of operation when route conditions are favorable to do so in order to, for example, reduce fuel consumption or management aftertreatment component temperature(s). The driveline disengagement decouples engine 104 from driveline 107 and therefore reduces engine drag and increases vehicle momentum, which postpones the return to high fuel burn conditions. The determination of favorable route conditions can be enhanced with look-ahead route data.

The CEM control unit 150 may include ICM controller 152. ICM controller 152 is configured with an ICM control scheme that, when enabled, operates in the same general vehicle speed range as traditional lower droops in cruise control speed and can replace cruise control lower droops. When ICM is enabled, the engine brakes behave the same as when ICM is disabled. If cruise control operation with engine brakes is enabled, the engine brakes can be turned on and off at the same vehicle speed with and without ICM enabled. In addition, ICM can be disabled for a calibratable period of time after a cruise control speed bump down.

Inputs received from PCC controller 142 are used by CEM control unit 150 and ICM controller 152 to enhance ICM. The messages/outputs from PCC controller 142 that control predictive cruise control operations are independent of ICM controller 152, and ICM controller 152 cannot predict the various outputs from PCC controller 142. In order to receive the outputs from PCC controller 142, CEM control unit 150 and/or ICM controller 152 can be connected with PCC controller 142 to provide a datalink with a wired, wireless, BLUETOOTH, or satellite connection, for example.

ECU 130, TCU 140, PCC controller, 142, ICM controller 152 and CEM control unit 150 are exemplary components of an integrated circuit-based electronic control system (ECS) which may be configured to control various operational aspects of vehicle 100 and powertrain 102 as described in further detail herein. An ECS according to the present disclosure may be implemented in a number of forms and may include a number of different elements and configurations of elements. In certain preferred forms an ECS may incorporate one or more microprocessor-based or microcontroller-based electronic control units sometimes referred to as electronic control modules. An ECS according to the present disclosure may be provided in forms having a single processing or computing component, or in forms comprising a plurality of operatively coupled processing or computing components; and may comprise digital circuitry, analog circuitry, or a hybrid combination of both of these types. The integrated circuitry of an ECS and/or any of its constituent processors/controllers or other components may include one or more signal conditioners, modulators, demodulators, arithmetic logic units (ALUs), central processing units (CPUs), limiters, oscillators, control clocks, amplifiers, signal conditioners, filters, format converters, communication ports, clamps, delay devices, memory devices, analog to digital (A/D) converters, digital to analog (D/A) converters, and/or different circuitry or functional components as would occur to those skilled in the art to provide and perform the communication and control aspects disclosed herein.

Figure 2:
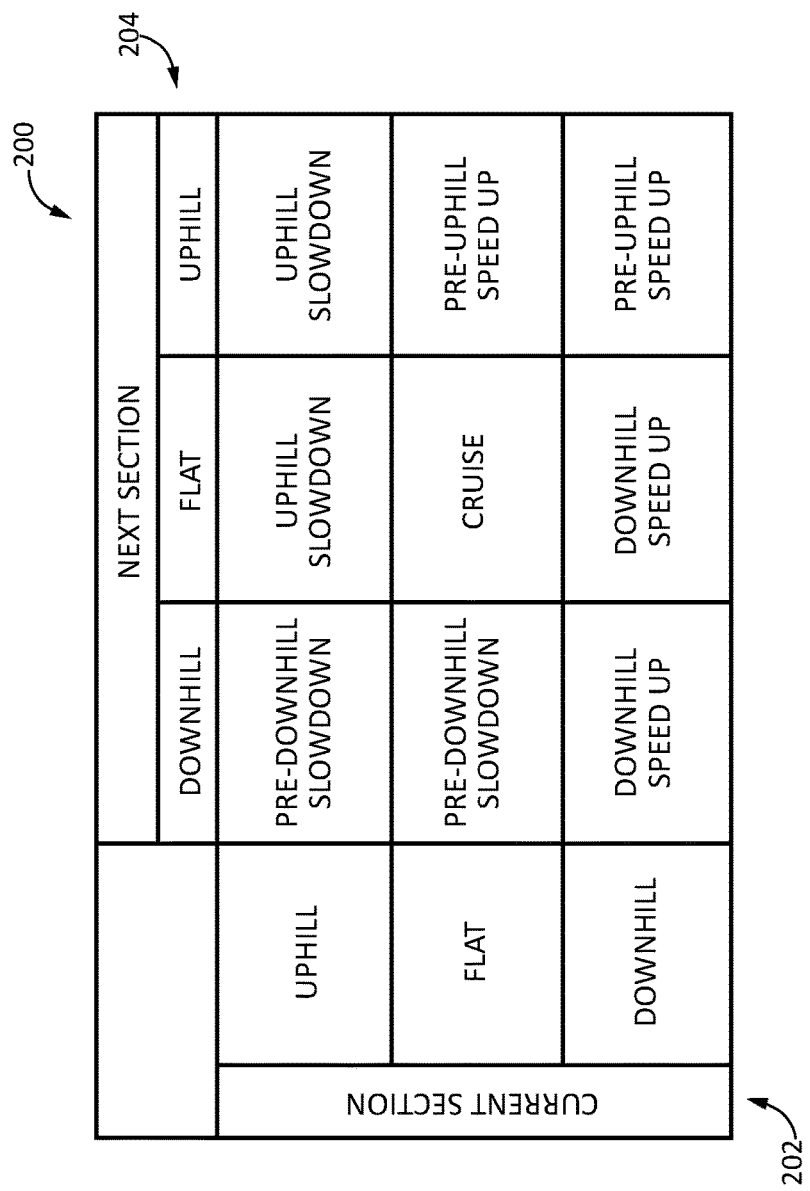
FIG. 2 is an example speed mode lookup table.

FIG. 2 illustrates an example speed mode lookup table 200 as a function of a current route section axis 202 and a next route section axis 204. Each route section axis 202, 204 includes each surface classification for mapping a current speed mode based on the current route section and the next route section. Speed mode lookup table 200 is one example of control logic which may be utilized in connection with PCC controls in order to determine an operating mode value for use in connection with the OCC functionality. Speed mode lookup table 200 also provides one example of control logic which may be utilized in connection with ICM controls in order to determine an operating mode value for use in connection with the ICM functionality. In certain preferred forms, rather than using modes, the ICM controls may utilize a continuous estimation or prediction of vehicle speed without using categories or groups of operating conditions. When the current route section is classified as an uphill surface and the next route section is classified as a downhill surface, the current speed mode would be set to the pre-downhill slowdown mode. When the current route section is classified as a flat surface and the next route section is classified as a downhill surface, the current speed mode would be set to the pre-downhill slowdown mode. When the current route section is classified a downhill surface and the next route section is classified as a downhill surface, the current speed mode would be set to the downhill speed up mode.

With continuing reference to table 200, when the current route section is classified as an uphill surface and the next route section is classified as a flat surface, the current speed mode would be set to the uphill slowdown mode. When the current route section is classified as a flat surface and the next route section is classified as a flat surface, the current speed mode would be set to the cruise mode. When the current route section is classified a downhill surface and the next route section is classified as a flat surface, the current speed mode would be set to the downhill speed up mode.

Referring further to table 200, when the current route section is classified as an uphill surface and the next route section is classified as an uphill surface, the current speed mode would be set to the uphill slowdown mode. When the current route section is classified as a flat surface and the next route section is classified as an uphill surface, the current speed mode would be set to the pre-uphill speed up mode. When the current route section is classified a downhill surface and the next route section is classified as an uphill surface, the current speed mode would be set to the pre-uphill speed up mode.

It is contemplated that the classifications for current route section axis 202 may be determined using a number of techniques including, for example, information from a grade sensor such as an inclinometer or computer model structured to determine or estimate grade information from a map or geographic information system (GIS) data set which may be provided on board a vehicle or received via transmission from a remote location or combinations of such techniques. It is contemplated that the classifications for next route section axis 204 may be determined using a number of techniques including, computer model structured to determine or estimate grade look ahead or future information from a combination of future location information and map or geographic information system (GIS) data set which may be provided on board a vehicle or received via transmission from a remote location or combinations of such techniques.

Further details of non-limiting examples of a procedure for determining road grade are illustrated and described in connection with FIG. 3. It is further contemplated that different surface classifications and/or speed modes may be used in addition to or as an alternative to the surface classifications and speed modes illustrated in FIG. 2, in which case the speed mode lookup table axes 802, 804 may be modified to reflect the different surface classifications and/or speed modes.

Figure 3:
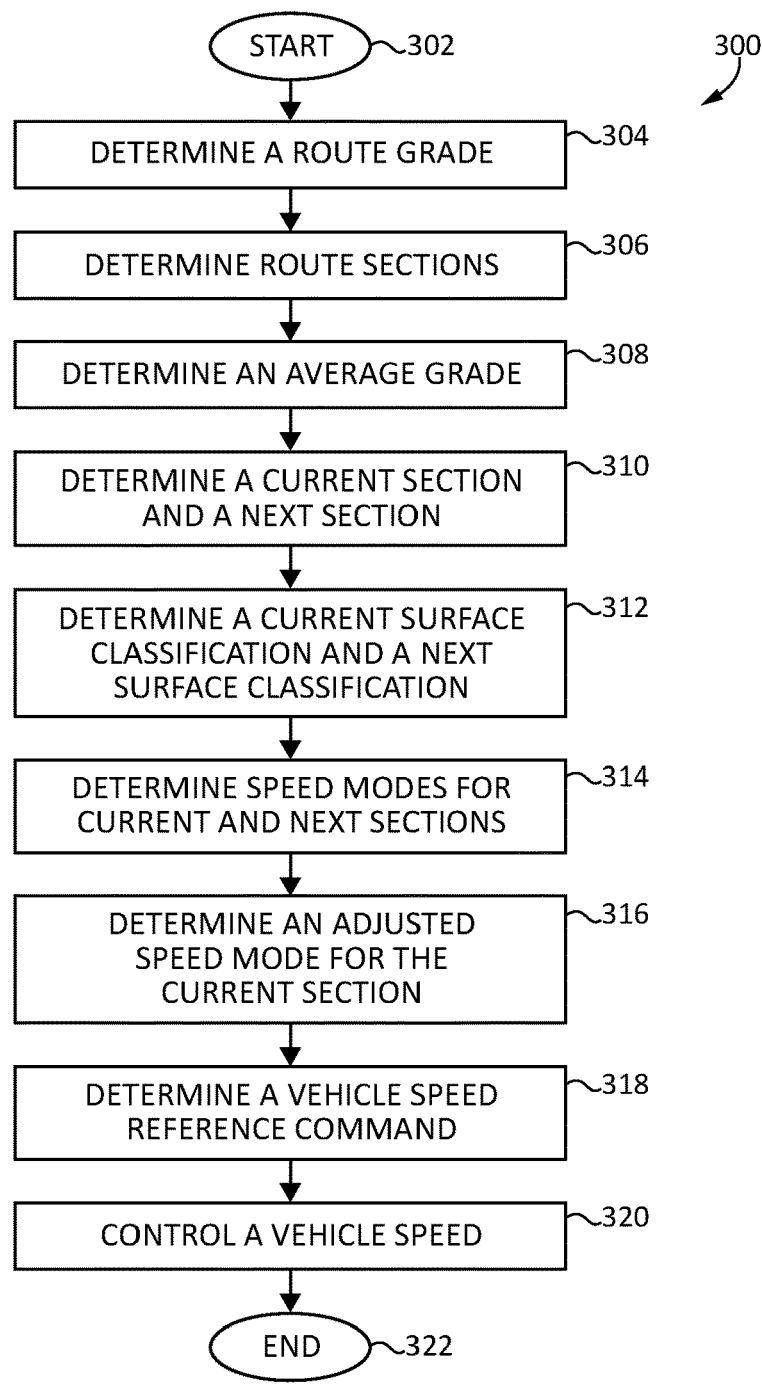
FIG. 3 is a flow diagram illustration of an example procedure for determining a vehicle speed reference.

With reference to FIG. 3, there is illustrated a flow diagram of an example procedure 300 for determining a vehicle speed reference command which may be utilized in controlling vehicle speed. The vehicle speed reference may be, for example, a cruise control reference speed utilized in connection with PCC controls. A procedure similar to procedure 300 could also be utilized in connection with ICM controls, although, in certain preferred forms, rather than using route sections and average grades for sections, the ICM controls may utilize a continuous estimation or prediction of vehicle speed. In certain embodiments the vehicle speed reference may be provided to a vehicle system, such as vehicle system 100, to control a vehicle speed for a vehicle that is put into operation by programming the PCC controller 140 for use in, for example, vehicle system 100. In certain embodiments, the example procedure 300 may be used to control the vehicle speed of a vehicle operating in a PCC-type cruise control mode. In addition to or as an alternative to providing the vehicle speed reference to the vehicle system to control the vehicle speed, it is contemplated that in certain embodiments the vehicle speed reference may be provided to an output device for displaying an indication of the vehicle speed reference. Such output devices may include a dashboard device, a printer, a handheld or mobile device, a public datalink, a device in operative communication with a public datalink, a private datalink, a device in operative communication with a private datalink, a non-transient memory storage location, anon-transient memory buffer accessible to a datalink, a remote network, a device in operative communication with a remote network, and/or a like device capable of displaying an indication of the vehicle speed reference. Procedure 300 begins at operation 302, in which a control routine is started for providing a route grade signal to PCC controller 140 to determine the vehicle speed reference. Operation 302 may begin by interpreting a key-on event, completion of a cycle, restarting procedure 300, or by initiation by the vehicle operator or a technician.

Procedure 300 continues to operation 304, where a route grade is determined based on the route grade signal. It is contemplated that in certain embodiments, the route grade may be for the entire route or a portion of the route. It is further contemplated that the route grade signal may be filtered, such as by a low pass filter, for example. Procedure 300 continues from operation 304 to operation 306, where route sections are determined based on the route grade signal and a route section length. It is contemplated that in certain embodiments the route section length may be a static length defined at the beginning of the route and/or a dynamic length that may be redefined throughout the route. Procedure 300 continues to operation 308, where an average grade is determined based on the route grade and the route section length. In certain embodiments a simple averaging function may be used. It is contemplated that in certain embodiments the average grade function may only use a portion of the route grade.

From operation 308, procedure 300 continues to procedure 310, where a current section and a next section are determined from the route sections determined at operation 306. Procedure 300 continues to operation 312, where each of the current and next sections are classified with a surface classification. It is contemplated that in certain embodiments, a threshold may be used to reduce/remove signal chattering, or signal deviations, to determine the surface classification. In certain embodiments, the surface classification may include one of an uphill surface, a downhill surface, and/or a flat surface. Procedure 300 continues from operation 312 to operation 314, where a speed mode is determined for each of the current and next sections based on the surface classification for each section determined in operation 312. The speed mode for each section may be determined using a lookup table as a function of the current section surface classification and the next section surface classification. In certain embodiments, the speed mode may include a cruise mode, a pre-uphill speedup mode, an uphill slowdown mode, a pre-downhill slowdown mode, and/or a downhill speedup mode.

From operation 314, procedure 300 continues to operation 316, where an adjusted speed mode for the current section is determined based on the current and next section speed modes determined in operation 314. Procedure 300 then continues to operation 318, where a vehicle speed reference command is determined. In certain embodiment, the vehicle speed reference command may be determined as a function of the current velocity, the average grade, and the current speed mode. Procedure 300 continues from operation 318 to operation 320, where a vehicle speed is controlled based on the vehicle speed reference command determined at operation 318. In certain embodiments, the vehicle speed reference command may include one or more vehicle speed reference commands sent to the ECU 130, another controller, and/or directly to one or more speed control components of vehicle system 100. The speed control components may include a brake actuator, a throttle actuator, a fuel injector, a transmission gear, a final drive, a cruise control system, and/or a prime mover 104 request directed toward prime mover 104 torque, for example. Procedure 300 is complete and ends at operation 322, where procedure 300 may be restarted such that the section after the next route section becomes the next route section and the previous next route section becomes the current route section. Procedure 300 may be repeated for the entire route grade signal.

With reference to FIG. 4a, there are illustrated exemplary controls 400 which may be implemented in one or more control components of an electronic control system such as the components described in connection with FIG. 1. Controls 400 include a predictive cruise control (PCC) block 402. The PCC block 402 receives as input a look-ahead grade value 404 and outputs a velocity offset value 410. Velocity offset value 410 and driver set speed value 406 are provided as inputs to operator 408 which add its inputs and provides a cruise reference speed value 412 as output.

With reference to FIG. 4b, there are illustrated further details of an exemplary implementation of PCC block 402. In the illustrated form PCC block 402 includes a hill sensor block 426 which receives as inputs a vehicle cruise set value (Vcrusieset) 420, vehicle configuration value(s) 422 including one or more of a vehicle mass value, a wheel radius, an axle ratio (e.g., a rear axle ration in the case of a rear wheel drive vehicle), a transmission gear ratio, a motoring curve value and a torque curve value, and grade value 424. The hill sensor block 426 outputs a grade power value 428, a hill value 430, and a base power value 432. The hill value 430 is provided as input to mode selection block 433, which outputs a mode value 434. Mode value 434, grade power value 428 and base power value 432 are provided as inputs to piecewise linear speed referencing block 436 which determines an output a velocity offset value 410. As illustrated in FIG. 4a, the velocity offset value 410 and driver set speed value 406 are provided as inputs to operator 408 which add its inputs and provides a cruise reference speed value 412 as output.

Figure 5A:
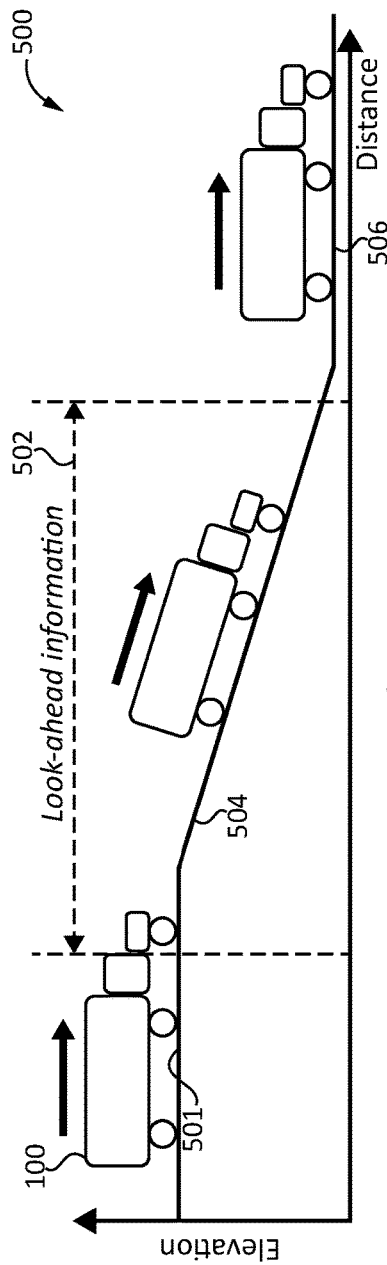
FIGS. 5a and 5b are schematic illustrations depicting certain aspects of the operation of the controls of FIGS. 4a and 4b.
Figure 5B:
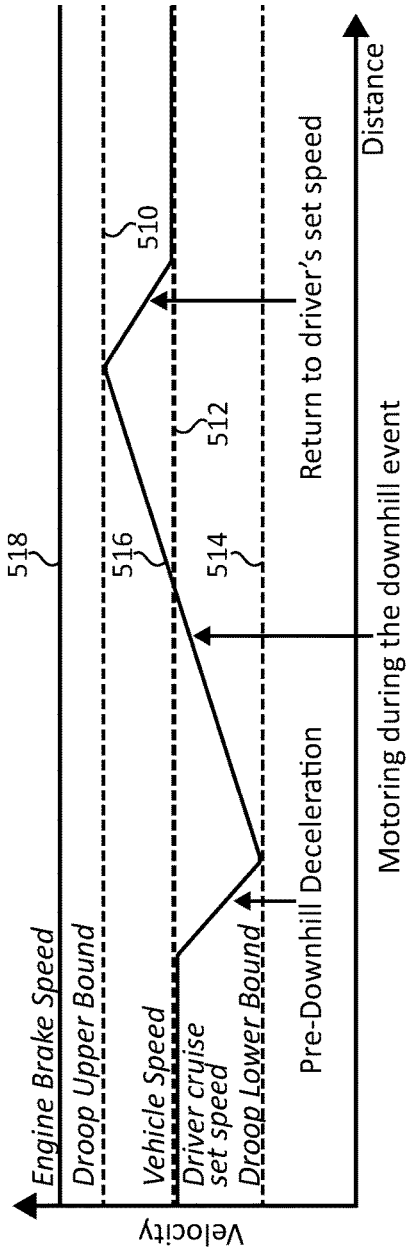

With reference to FIGS. 5a and 5b, there are illustrated diagrams 500 depicting certain aspects of the operation of control 400 during certain operation of a vehicle 100. As illustrated FIG. 5a, a vehicle 100 traveling on a flat route segment 501 may be provided with look ahead information 502 regarding future route road grade. In the illustrated example, look-ahead or future road grade information indicates that vehicle 100 will travel over a route segment 504 having a downhill road grade and, subsequently, will travel over a route segment 506 having a flat road grade. In response to this look ahead information, PCC block 402 is operable to modulate a cruise reference speed value which is initially set based upon driver cruise set speed value 512 which has been set by a vehicle operator.

The modulation performed by PCC block 402 allows the cruise reference speed to be modulated within an upper boundary value 510 and a lower boundary value 514 as reflected by the illustrated variation in vehicle speed value 516. Based on look-ahead information indicating that vehicle 100 will in the future travel over a downhill grade route segment 504, the cruise reference speed value may be modulated to allow vehicle speed value 516 to decrease below driver cruise set speed value 512 down to the lower boundary value 514 in anticipation of a downhill acceleration. As vehicle 100 travels downhill over route segment 504, it accelerates and the cruise reference speed value is increased to permit vehicle speed 516 to increases up to upper boundary value 510. As vehicle 100 travels over route segment 506, it decelerates and the cruise reference speed value is decreased to the driver cruise set speed 512 to permit vehicle speed 516 to decrease to driver cruise set speed 512.

The PCC block 402 modulation of cruise speed may provide operation of a prime mover with higher net brake thermal efficiency (BTE) and, at the same time, providing an average route speed and trip time close to what it would be if the cruise reference speed value was maintained constant at the value of the driver cruise set speed 512 throughout the route. At the same time, the cruise reference speed is modulated within droop upper bound 510 and droop lower bound 514.

FIGS. 6a-6d depict graphs 600 illustrating operation of exemplary ICM controls. Graphs 600 illustrate an embodiment in which an ICM control scheme structured to reduce an engagement/disengagement frequency of the prime mover 104 from ground contacting wheels 126a, 126b or other ground contacting wheels or driven portions of driveline 107, in order to extend ICM coasting when a temporary speed loss during the coasting event is predicted to be within a tolerance band. Shown in FIG. 6a is a schematic of a vehicle 100 on an overall downhill grade having an intermediate uphill segment. FIGS. 6b-6d depict several aspects of the operation of ICM controls over this vehicle's route and provide a comparison to baseline operation of vehicle 100 without ICM controls.

In such controls, the ICM active schemes including a baseline cruise control, an idle coast management (ICM) control scheme (e.g. a standard ICM, or simply ICM), and an ICM control scheme with a horizon look-ahead 502 (e.g. ICM with Horizon). Any of the ICM and ICM with Horizon can be implemented in the CEM 150. The ICM with Horizon control scheme will be described in more detail below, but in general includes the ability to look ahead and use future road conditions/grades to influence control system actions. Unless otherwise indicated explicitly to the contrary, as used herein, the various embodiments described below in the other figures in which the description refers to future road grades can likewise utilize the full spectrum of look ahead road information not just limited to road grade, such as but not limited to speed limits, road hazards, etc. In this embodiment in FIGS. 6a-6d, it is used to influence a reduction in engagement/disengagement frequency. The ICM with Horizon featured depicted in the figures includes embodiments of the instant application which assist in reducing engagement/disengagement frequency and extend the coasting event.

FIG. 6b illustrates one example of the operation of ICM as vehicle 100 travels over the route depicted in FIG. 6a. As denoted by curve 602, as the vehicle travels down a first downhill grade portion of its route, the ICM controls are on or active, meaning that the prime mover 104 of vehicle 100 is disconnected from the ground engaging wheels of driveline 107. When the vehicle encounters a middle flat or uphill grade portion of the route, the ICM controls turn off or deactivate reengaging the prime move 104 and the ground engaging wheels of driveline 107. When the vehicle encounters another downhill grade portion of its route, the ICM controls again turn on or become active and the prime mover 104 is again disengaged from driveline 107.

FIG. 6b depicts operation in ICM in line 603 in which the coasting event is initially ON, is temporarily switched OFF during the intermediate uphill segment, and is then switched ON again after resumption of the downhill coasting event. In a further embodiment, ICM controls may utilize look-ahead information to further reduce or eliminate the middle region in which the curve 602 transitions from ON to OFF. In such embodiments, information that future road grade will return to downhill may be used to further increase vehicle speed to mitigate speed decrease during uphill coasting. Additionally, or alternatively, a lower speed threshold may be tolerated without disengaging or turning off the ICM controls in anticipation that the lost speed will be regained over a subsequent downhill.

FIG. 6c illustrates vehicle speed profile curve 604 which results from the operation of ICM controls according to curve 602 of FIG. 6b as well as a vehicle speed profile curve 606 which results from vehicle operation without use of ICM controls. Is indicated by the divergence of curve 604 from curve 606, when the ICM controls are active, disengagement of the prime mover 104 from the driveline 107 over downhill grade segments allows vehicle speed to increase due to the absence of engine motoring which slows downhill acceleration. In embodiments in which the ICM controls utilize look-ahead information, a larger decrease in vehicle speed over the middle region of illustrated vehicle route may be permitted in anticipation of a subsequent downhill grade.

FIG. 6d illustrates the fueling commands corresponding to operation under ICM control and baseline vehicle operation without ICM control. Fueling curve 608 illustrates fueling during baseline operation. Fueling curve 610 illustrates fueling under ICM control. As indicated by the divergence of curve 610 from curve 608, operation under ICM control delays and shortens a fueling event that occurs when the vehicle encounters the middle flat or uphill portion of its route. This delay in fueling is made possible because the increased vehicle speed during the preceding downhill coast portion of the vehicle route allow vehicle speed to be maintained above a minimum threshold until a later point in the vehicle route. Furthermore, operation under ICM control allows the return to fueling at the end of the illustrated downhill route to be delayed. Accordingly, overall fueling is reduced in operation under ICM control relative to nominal operation. In embodiments in which the ICM controls utilize look-ahead information, the return to fueling in the middle portion of the vehicle route may be further decreased or eliminated entirely.

Figure 7:
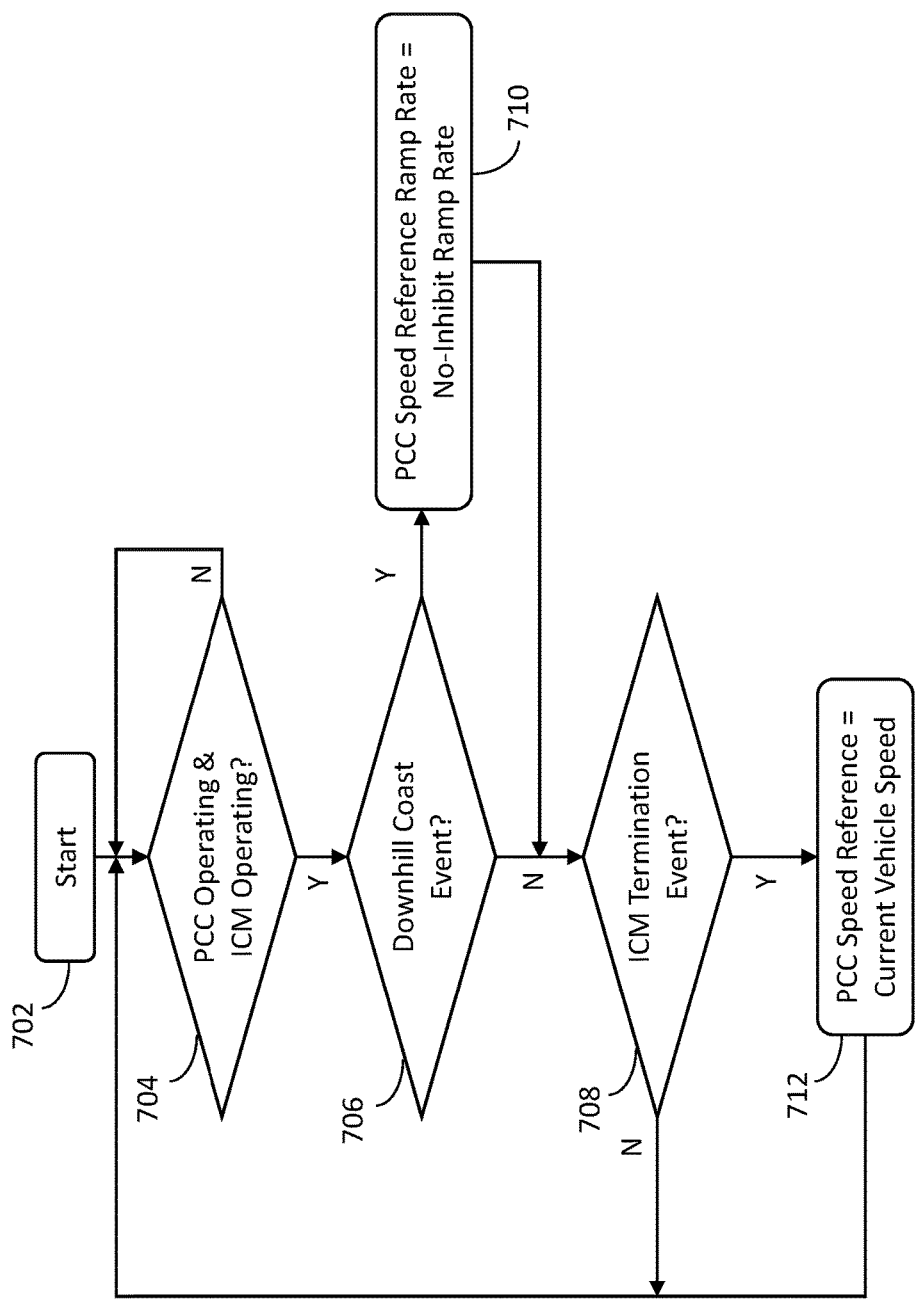
FIG. 7 is a flow diagram illustration of an example exemplary controls providing optimization of concurrent operation of a predictive cruise control (PCC) controller and an ICM controller.

FIG. 7 is a flow diagram illustrating an exemplary control process 700 providing optimization of concurrent operation of PCC controls and ICM controls. Process 700 begins at start operator 702 and proceeds to conditional 704 which evaluates whether PCC controls are operating and ICM controls are operating. If conditions 704 determines that one or both conditions is not true, it repeats. If conditional 704 determines that both conditions are true, process 700 proceeds to conditional 706.

Conditional 706 evaluates whether a downhill coast operating condition is true. If true conditional 706 determines if a downhill coast event is true, process 700 proceeds to operator 710 which sets PCC cruise control speed reference ramp rate to a no-inhibit ramp rate. The no-inhibit ramp rate is configured to optimize concurrent operation of PCC controls and ICM controls by limiting the rate of change of the PCC speed reference to avoid triggering a termination or abort of concurrently operating ICM controls. By limiting the ramp rate or rate of increase of the PCC Further details of the PCC speed reference, inadvertent termination of ICM control operation can be avoided. Further details of one example of such operation are described in connection with FIG. 8.

If operator 706 determines that a downhill coast event is false, process 700 proceeds to conditional 708. Process 700 also proceeds to conditional 708 from 710. Conditional 708 evaluates whether an ICM termination or abort event is true. If conditional 708 evaluates that an ICM termination or abort event is not true, process 700 proceeds to conditional 704. If conditional 708 evaluates that an ICM termination or abort event is true, process 700 proceeds to operator 712 which sets the PCC speed reference equal to the current vehicle speed. By setting the PCC speed reference equal to the current vehicle speed unintended and unnecessary acceleration events at the end of ICM operation can be avoided which would otherwise occur due to divergence from the PCC speed reference and actual vehicle speed as can occur during ICM operation. These undesired acceleration events may occur, for example, at the end of a downhill coast when ICM operation terminates under conditions where the PCC speed reference is higher than the actual vehicle speed and perhaps higher than the operator set cruise control speed resulting in unnecessary hard acceleration in an effort to meet the elevated speed reference. From operator 712, process 700 returns to operation 704.

Figure 8:
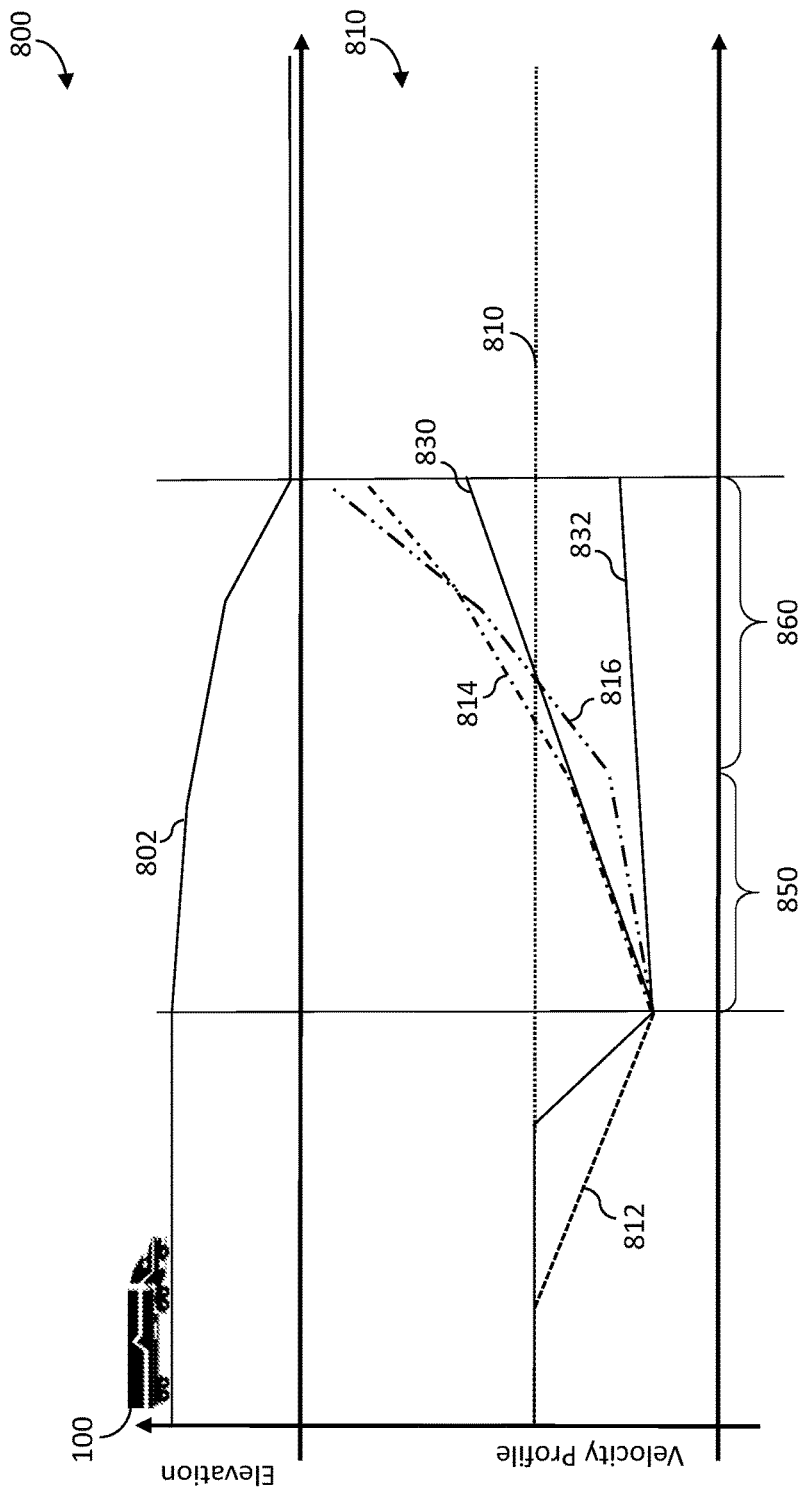
FIG. 8 is a schematic illustration of road grade over a vehicle route, PCC speed references and corresponding vehicle speeds over the route.

With reference to FIG. 8 there are illustrated graphs 800 and 810. Graph 800 illustrates elevation change and road grade over a travel route for vehicle 100. Graph 810 illustrates velocity profiles for a number of parameters over the travel route. Curve 810 depicts an operator cruise control set speed. Curve 830 depicts an unconstrained PCC speed reference. Curve 832 depicts a PCC speed reference that has been ramp rate limited. Curve 812 depicts velocity of vehicle 100 as a response to an ICM command to initiate a pre-downhill coast. Curve 814 depicts velocity of vehicle 100 in response to unconstrained PCC speed reference 830. Curve 816 depicts velocity of vehicle 100 in response to ramp rate limited PCC speed reference 832. As can be seen from the divergence of curve 816 from curve 814 in region 850, limiting the ramp rate of the PCC speed reference avoids termination ICM control and initiating fueling that would otherwise occur in response to unconstrained PCC speed reference 830. As can be seen from the divergence of curve 816 from curve 814 in region 860, limiting the ramp rate of the PCC speed reference also avoids motoring operation after the termination of ICM control that would otherwise occur in response to unconstrained PCC speed reference 830.

Figure 9A:
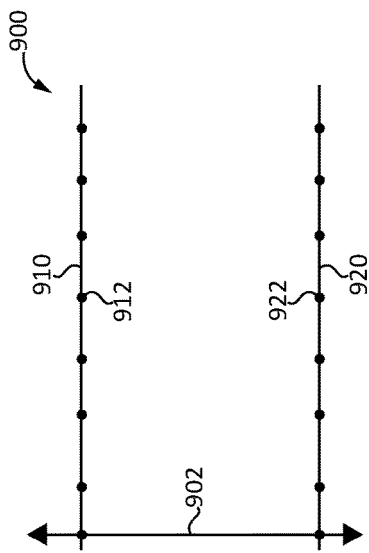
FIGS. 9A and 9B are graphs illustrating PCC and ICM control parameters in first and second control states.
Figure 9B:
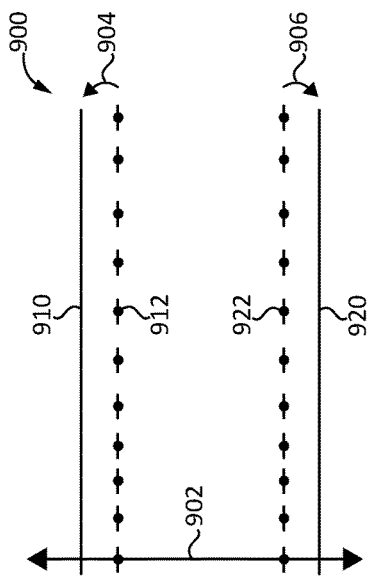

FIGS. 9A and 9B illustrate a graph 900 depicting PCC and ICM control parameters in first and second control states, respectively. The vertical axis of graph 900 indicates vehicle speed 902. The horizontal axis of graph 900 indicates time or distance along a vehicle operating horizon. The PCC and ICM control parameters illustrated in graph 900 are utilized by distinct ICM controls and PCC controls which operate concurrently, such as the controls disclosed herein. The PCC controls use PCC upper limit 910 and PCC lower limit 920 to define vehicle speed boundaries within which variation of a PCC reference speed is permitted and outside of which variation of PCC reference speed is limited. Thus, when a PCC operating mode is active, the PCC controls allow variation of the PCC reference speed until vehicle speed encounters either PCC upper limit 910 or PCC lower limit 920. The ICM controls use ICM upper limit 912 and ICM lower limit 922 to define vehicle speed boundaries within which ICM vehicle coasting operation is permitted to continue and outside of which ICM vehicle coasting operation will terminate. Thus, once an ICM vehicle coasting operation is initiated, the ICM controls will allow this operation to continue until vehicle speed encounters either ICM upper 910 or ICM lower 920. It shall be appreciated that analogous limits may be provided for enablement or initiation of PCC operation or ICM operation. In this case the PCC upper limit and the PCC lower limit define the boundaries within which PCC operation is enabled and may be initiated, and the ICM upper limit and the ICM lower limit define the boundaries within which ICM operation is enabled and may be initiated.

In the control state of FIG. 9A ICM upper limit 912 is set at a lower vehicle speed than PCC upper limit 910. In this control state, there may be vehicle operating conditions under which ICM coasting operation is aborted or terminated when vehicle speed hits ICM upper limit 912, but would otherwise be permitted to continue until the vehicle speed hit PCC upper limit 910 which would then command engine engagement with the driveline causing ICM coasting operation to abort or terminate. Such operating conditions may present an opportunity to adjust ICM upper limit 912 to extend ICM coasting operation thereby decreasing fuel consumption. The adjustment of ICM upper limit 912 may comprise increasing ICM upper limit 912 as indicated by arrow 904 so that ICM upper limit 912 is equal to PCC upper limit 910 to achieve the control state illustrated in FIG. 9B. In other embodiments the adjustment of ICM upper limit 912 may comprise increasing ICM upper limit 912 by a lesser amount so that ICM upper limit 912 is closer to but still less than PCC upper limit 910 or increasing ICM upper limit 912 by a greater amount such that ICM upper limit 912 is greater than PCC upper limit 910.

In the control state of FIG. 9A, ICM lower limit 922 is set at a greater vehicle speed than PCC lower limit 920. Thus, there may be vehicle operating conditions under which ICM coasting operation is aborted or terminated when vehicle speed hits ICM lower limit 922, but would otherwise be permitted to continue until the vehicle speed hit PCC lower limit 920 which would then command engine engagement with the driveline causing ICM coasting operation to abort or terminate. Such operating conditions may present an opportunity to adjust ICM lower limit 922 to extend ICM coasting operation thereby decreasing fuel consumption. The adjustment of ICM lower limit 922 may comprise decreasing ICM lower limit 922 as indicated by arrow 906 so that ICM lower limit 922 is equal to PCC lower limit 920 to achieve the control state illustrated in FIG. 9B. In other embodiments the adjustment of ICM lower limit 922 may comprise decreasing ICM lower limit 922 by a lesser amount so that ICM lower limit 922 is closer to but still greater than PCC lower limit 920 or decreasing ICM lower limit 922 by a greater amount such that ICM lower limit 922 is less than PCC lower limit 910.

Figure 10A:
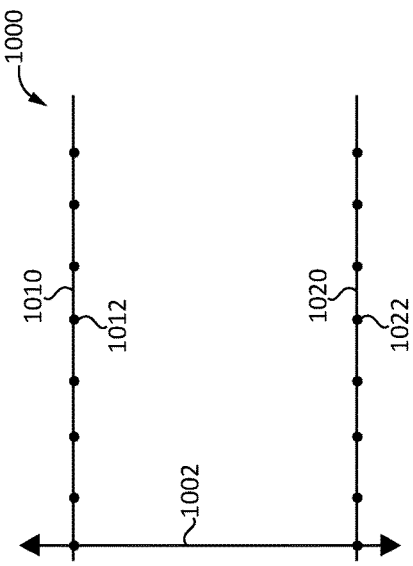
FIGS. 10A and 10B are graphs illustrating PCC and ICM control parameters in first and second control states.
Figure 10B:
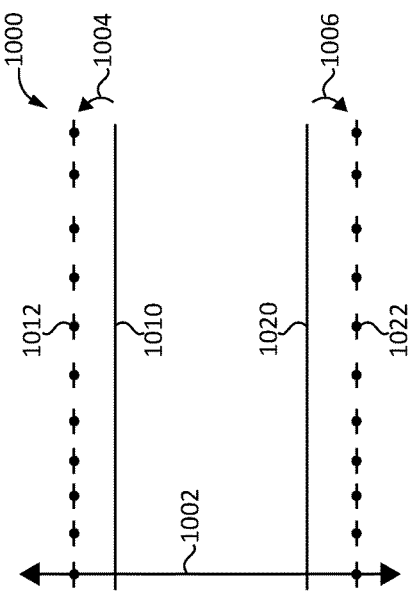

FIGS. 10A and 10B illustrate a graph 1000 depicting PCC and ICM control parameters in first and second control states, respectively. The vertical axis of graph 1000 indicates vehicle speed 1002. The horizontal axis of graph 1000 indicates time or distance along a vehicle operating horizon. The PCC and ICM control parameters illustrated in graph 1000 are utilized by distinct ICM controls and PCC controls which operate concurrently, such as the controls disclosed herein. The PCC controls use PCC upper limit 1010 and PCC lower limit 1020 to define vehicle speed boundaries within which variation of a PCC reference speed is permitted and outside of which variation of the PCC reference speed is limited. Thus, when a PCC operating mode is active, the PCC controls allow variation of the PCC reference speed until vehicle speed encounters either PCC upper limit 1010 or PCC lower limit 1020. The ICM controls use ICM upper limit 1012 and ICM lower limit 1022 to define vehicle speed boundaries within which ICM vehicle coasting operation is permitted to continue and outside of which ICM vehicle coasting operation will terminate. Thus, once an ICM vehicle coasting operation is initiated, the ICM controls will allow this operation to continue until vehicle speed encounters either ICM upper 1010 or ICM lower 1020. It shall be appreciated that analogous limits may be provided for enablement or initiation of PCC operation or ICM operation. In this case the PCC upper limit and the PCC lower limit define the boundaries within which PCC operation is enabled and may be initiated, and the ICM upper limit and the ICM lower limit define the boundaries within which ICM operation is enabled and may be initiated.

In the control state of FIG. 10A PCC upper limit 1010 is set at a lower vehicle speed than ICM upper limit 1012. In this control state, there may be vehicle operating conditions under which ICM coasting operation is aborted or terminated when vehicle speed hits PCC upper limit 1010, but would otherwise be permitted to continue until the vehicle speed hit ICM upper limit 1012 which would then command engine engagement with the driveline causing ICM coasting operation to abort or terminate. Such operating conditions may abort ICM operation due to the fact that the PCC upper limit can in some forms be configured to trigger vehicle braking and therefore connects the engine with the wheels ending ICM operation. Such operating conditions may present an opportunity to adjust PCC upper limit 1010 to extend ICM coasting operation thereby decreasing fuel consumption. The adjustment of PCC upper limit 1010 may comprise increasing PCC upper limit 1010 as indicated by arrow 1004 so that PCC upper limit 1010 is equal to ICM upper limit 1012 to achieve the control state illustrated in FIG. 10B. In other embodiments, the adjustment of PCC upper limit 1010 may comprise increasing PCC upper limit 1010 by a lesser amount so that PCC upper limit 1010 is closer to but still less than ICM upper limit 1012 or increasing PCC upper limit 1010 by a greater amount such that PCC upper limit 1010 is greater than ICM upper limit 1012.

In the control state of FIG. 10A, PCC lower limit 1020 is set at a greater vehicle speed than ICM lower limit 1022. Thus, there may be vehicle operating conditions under which ICM coasting operation is aborted or terminated when vehicle speed hits PCC lower limit 1020, but would otherwise be permitted to continue until the vehicle speed hit ICM lower limit 1022 which would then command engine engagement with the driveline causing ICM coasting operation to abort or terminate. Such operating conditions may abort ICM operation due to the fact that the PCC lower limit triggers traction power demand and therefore connects the engine with the wheels ending ICM operation. Such operating conditions may present an opportunity to adjust PCC lower limit 1020 to extend ICM coasting operation thereby decreasing fuel consumption. The adjustment of PCC lower limit 1020 may comprise decreasing the PCC lower limit 1020 as indicated by arrow 1006 so that PCC lower limit 1020 is equal to ICM lower limit 1022 to achieve the control state illustrated in FIG. 10B. In other embodiments, the adjustment of PCC lower limit 1020 may comprise decreasing the PCC lower limit 1020 by a lesser amount so that PCC lower limit 1020 is closer to but still greater than ICM lower limit 1022 or decreasing PCC lower limit 1020 by a greater amount such that PCC lower limit 1020 is less than ICM lower limit 1022.

Figure 11A:
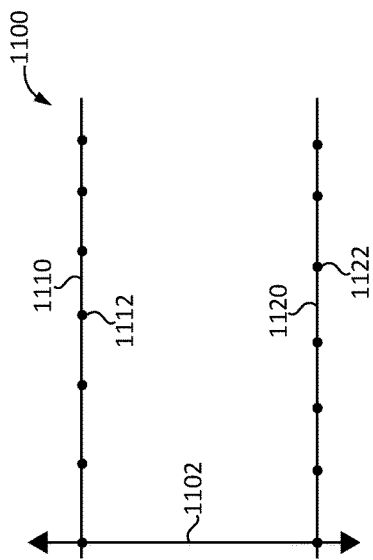
FIGS. 11A and 11B are graphs illustrating PCC and ICM control parameters in first and second control states.
Figure 11B:
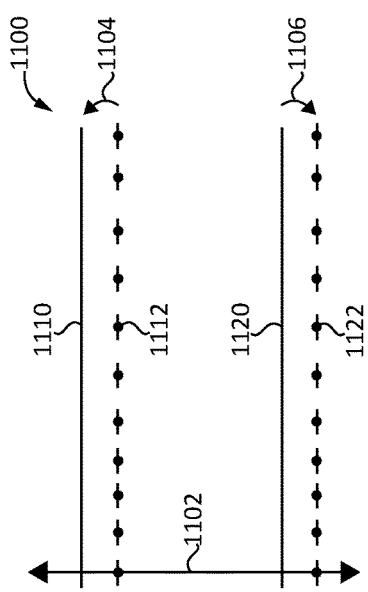

FIGS. 11A and 11B illustrate a graph 1100 depicting PCC and ICM control parameters in first and second control states, respectively. The vertical axis of graph 1100 indicates vehicle speed 1102. The horizontal axis of graph 1100 indicates time or distance along a vehicle operating horizon. The PCC and ICM control parameters illustrated in graph 1100 are utilized by distinct ICM controls and PCC controls which operate concurrently, such as the controls disclosed herein. The PCC controls use PCC upper limit 1110 and PCC lower limit 1120 to define vehicle speed boundaries within which variation of a PCC reference speed is permitted and outside of which variation of the PCC reference speed is limited. Thus, when a PCC operating mode is active, the PCC controls allow variation of the PCC reference speed until vehicle speed encounters either PCC upper limit 1110 or PCC lower limit 1120. The ICM controls use ICM upper limit 1112 and ICM lower limit 1122 to define vehicle speed boundaries within which ICM vehicle coasting operation is permitted to continue and outside of which ICM vehicle coasting operation will terminate. Thus, once an ICM vehicle coasting operation is initiated, the ICM controls will allow this operation to continue until vehicle speed encounters either ICM upper 1110 or ICM lower 1120. It shall be appreciated that analogous limits may be provided for enablement or initiation of PCC operation or ICM operation. In this case the PCC upper limit and the PCC lower limit define the boundaries within which PCC operation is enabled and may be initiated, and the ICM upper limit and the ICM lower limit define the boundaries within which ICM operation is enabled and may be initiated.

In the control state of FIG. 11A ICM upper limit 1112 is set at a lower vehicle speed than PCC upper limit 1110. In this control state, there may be vehicle operating conditions under which ICM coasting operation is aborted or terminated when vehicle speed hits ICM upper limit 1112, but would otherwise be permitted to continue until the vehicle speed hit PCC upper limit 1110 which would then command engine engagement with the driveline causing ICM coasting operation to abort or terminate. Such operating conditions may present an opportunity to adjust ICM upper limit 1112 to extend ICM coasting operation thereby decreasing fuel consumption. The adjustment of ICM upper limit 1112 may comprise increasing ICM upper limit 1112 as indicated by arrow 1104 so that ICM upper limit 1112 is equal to PCC upper limit 1110 to achieve the control state illustrated in FIG. 11B. In other embodiments the adjustment of ICM upper limit 1112 may comprise increasing ICM upper limit 1112 by a lesser amount so that ICM upper limit 1112 is closer to but still less than PCC upper limit 1110 or increasing ICM upper limit 1112 by a greater amount so that ICM upper limit 1112 is greater than PCC upper limit 1110.

In the control state of FIG. 11A, PCC lower limit 1120 is set at a greater vehicle speed than ICM lower limit 1122. Thus, there may be vehicle operating conditions under which ICM coasting operation is aborted or terminated when vehicle speed hits PCC lower limit 1120, but would otherwise be permitted to continue until the vehicle speed hit ICM lower limit 1122 which would then command engine engagement with the driveline causing ICM coasting operation to abort or terminate. Such operating conditions may present an opportunity to adjust PCC lower limit 1120 to extend ICM coasting operation thereby decreasing fuel consumption. The adjustment of PCC lower limit 1120 may comprise decreasing the PCC lower limit 1120 as indicated by arrow 1106 so that PCC lower limit 1120 is equal to ICM lower limit 1122 to achieve the control state illustrated in FIG. 11B. In other embodiments, the adjustment of PCC lower limit 1120 may comprise decreasing the PCC lower limit 1120 by a lesser amount so that PCC lower limit 1120 is closer to but still greater than ICM lower limit 1122 or decreasing the PCC lower limit 1120 by a greater amount so that PCC lower limit 1120 is less than ICM lower limit 1122.

It shall be appreciated that in other embodiments the relative positioning of PCC upper limit 1110 and ICM upper limit 1112 and the relative positioning of PCC lower limit 1120 and ICM lower limit 1122 control may be inverted relative to the control state of FIG. 11A. In such control states PCC upper limit 1110 may be set to a lower vehicle speed than ICM upper limit 1112 and ICM lower limit 1122 may be set at a greater vehicle speed than PCC lower limit 1120. Accordingly, PCC upper limit 1110 may be increased to move closer to, equal or be greater than ICM upper limit 1112 and ICM lower limit 1122 may be decreased to move closer to, equal or be less than PCC lower limit 1120.

Figure 12A:
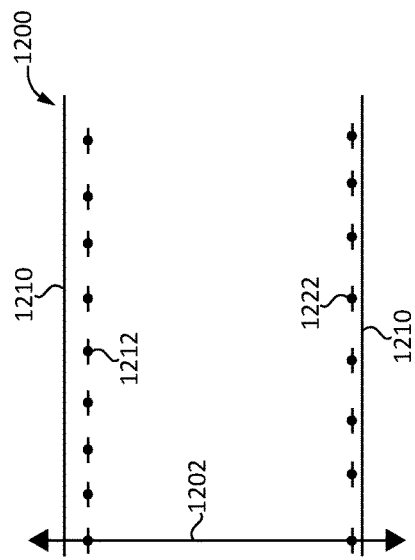
FIGS. 12A and 12B are graphs illustrating PCC and ICM control parameters in first and second control states.
Figure 12B:
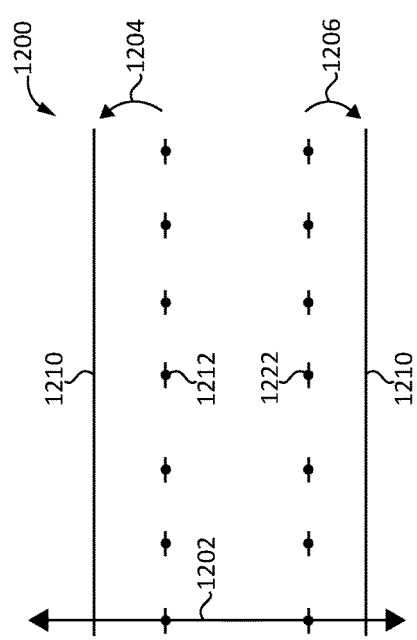

FIGS. 12A and 12B illustrate a graph 1200 depicting PCC and ICM control parameters in first and second control states, respectively. The vertical axis of graph 1200 indicates vehicle speed 1202. The horizontal axis of graph 1200 indicates time or distance along a vehicle operating horizon. The PCC and ICM control parameters illustrated in graph 1200 are utilized by distinct ICM controls and PCC controls which operate concurrently, such as the controls disclosed herein. The PCC controls use PCC upper limit 1210 and PCC lower limit 1220 to define vehicle speed boundaries within which variation of a PCC reference speed is permitted and outside of which variation of the PCC reference speed is limited. Thus, when a PCC operating mode is active, the PCC controls allow variation of the PCC reference speed until vehicle speed encounters either PCC upper limit 1210 or PCC lower limit 1220. The ICM controls use ICM upper limit 1212 and ICM lower limit 1222 to define vehicle speed boundaries within which ICM vehicle coasting operation is permitted to continue and outside of which ICM vehicle coasting operation will terminate. Thus, once an ICM vehicle coasting operation is initiated, the ICM controls will allow this operation to continue until vehicle speed encounters either ICM upper 1210 or ICM lower 1220. It shall be appreciated that analogous limits may be provided for enablement or initiation of PCC operation or ICM operation. In this case the PCC upper limit and the PCC lower limit define the boundaries within which PCC operation is enabled and may be initiated, and the ICM upper limit and the ICM lower limit define the boundaries within which ICM operation is enabled and may be initiated.

In the control state of FIG. 12A ICM upper limit 1212 is set at a lower vehicle speed than PCC upper limit 1210. In this control state, there may be vehicle operating conditions under which ICM coasting operation is aborted or terminated when vehicle speed hits ICM upper limit 1212, but would otherwise be permitted to continue until the vehicle speed hit PCC upper limit 1210 which would then command engine engagement with the driveline causing ICM coasting operation to abort or terminate. Such operating conditions may present an opportunity to adjust ICM upper limit 1212 to extend ICM coasting operation thereby decreasing fuel consumption. The adjustment of ICM upper limit 1212 may comprise increasing ICM upper limit 1212 as indicated by arrow 1204 so that ICM upper limit 1212 closer to but still less than PCC upper limit 1210 to achieve the control state illustrated in FIG. 12B.

In the control state of FIG. 12A, ICM lower limit 1222 is set at a greater vehicle speed than PCC lower limit 1220. Thus, there may be vehicle operating conditions under which ICM coasting operation is aborted or terminated when vehicle speed hits ICM lower limit 1222, but would otherwise be permitted to continue until the vehicle speed hit PCC lower limit 1220 which would then command engine engagement with the driveline causing ICM coasting operation to abort or terminate. Such operating conditions may present an opportunity to adjust ICM lower limit 1222 to extend ICM coasting operation thereby decreasing fuel consumption. The adjustment of ICM lower limit 1222 may comprise decreasing ICM lower limit 1222 as indicated by arrow 1206 so that ICM lower limit 1222 is closer to but still greater than PCC lower limit 1220 to achieve the control state illustrated in FIG. 12B.

Figure 13:
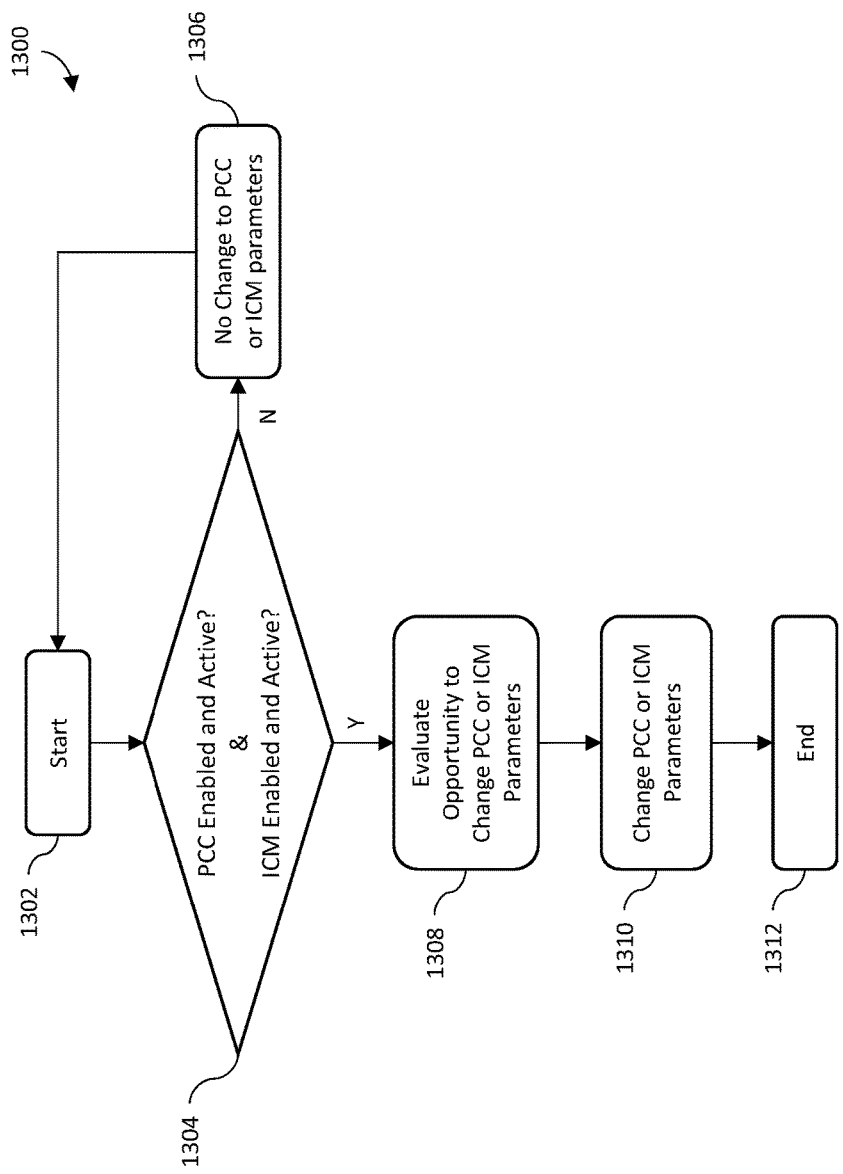
FIG. 13 is a flow diagram illustrating an exemplary control process.

FIG. 13 is a flow diagram of an exemplary control process 1300 which may be implemented in one or more components of an electronic control systems such as the electronic control systems and components disclosed herein. Control process 1300 is operable to determine changes in PCC control parameters and/or ICM control parameters such as the changes described in connection with FIGS. 9A and 9B, 10A and 10B, 11A and 11B or 12A and 12B. Control process 1300 begins at start operation 1302 and proceeds to conditional 1302 which evaluates whether PCC controls are both enabled and active and whether ICM controls are both enabled and active. If conditional 1302 evaluates that PCC controls are either not enabled, not active or both not enabled and not active or evaluates that ICM controls are either not enabled, not active or both not enabled and not active, process 1300 proceeds to operation 1306 which maintains the current state of all PCC and ICM control parameters unchanged. From operation 1306 process 1300 returns to start operation 1302.

If conditional 1302 evaluates that PCC controls are both enabled and active and that ICM controls both enabled and active, process 1300 proceeds to operation 1308 which evaluates whether an opportunity to change one or more PCC control parameters or ICM control parameters exists. In performing this evaluation, operation 1308 utilizes a predicted vehicle speed over a look ahead operating horizon. The predicted vehicle speed may be determined in response to look ahead operator commands, look ahead PCC commands, look ahead road grade, look ahead aerodynamic losses, look ahead road losses, and/or other look ahead parameters which can be utilized to calculate a predicted vehicle speed over a look ahead operating horizon utilizing.

Operation 1308 evaluates the predicted vehicle speed over the look ahead operating horizon to determine whether an opportunity to adjust one or more PCC control parameters or ICM control parameters to extend ICM operation that would otherwise terminate. By way of example, the predicted vehicle speed can be evaluated relative to the PCC upper limit, PCC lower limit, ICM upper limit and ICM lower limit parameters described in connection with FIGS. 9A and 9B, 10A and 10B, 11A and 11B or 12A and 12B in order to identify situations where ICM operation can be extended by modifying one or more of these parameters. Further details of two examples of such an evaluation are described in connection with FIGS. 14 and 15. As a result of this evaluation, adjustments to one or more PCC control parameters or ICM control parameters, for example, the PCC upper limit, PCC lower limit, ICM upper limit and ICM lower limit parameters, may be determined. From operation 1308, control process 1300 proceeds to operation 1310 which performs the determined adjustment of one or more PCC control parameters or ICM control parameters. From operation 1310, control process 1300 proceeds to end operation 1312 and may be repeated at a later point.

Figure 14:
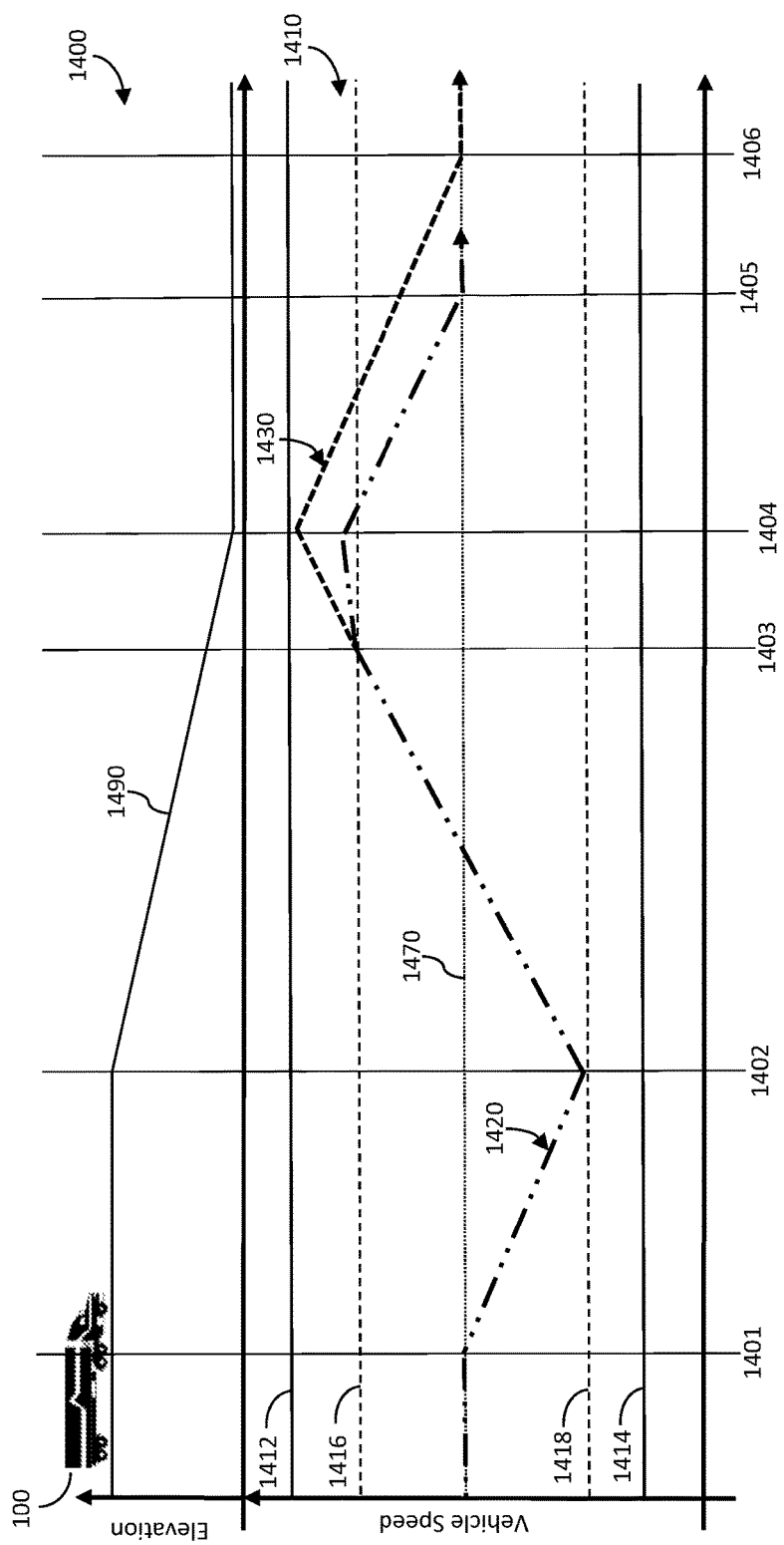
FIG. 14 illustrates graphs depicting elevation versus distance along a vehicle operating horizon, vehicle speed versus distance along the vehicle operating horizon and the interaction of projected vehicle speed curves with ICM and PCC control parameters.

FIG. 14 illustrate a graph 1400 depicting elevation on its vertical axis, distance along a vehicle operating horizon for a vehicle 100 on its horizontal axis and curve 1490 which indicates variation in road grade over the vehicle operating horizon. FIG. 14 also illustrate a graph 1410 depicting vehicle speed on its vertical axis, distance along a vehicle operating horizon on its horizontal axis, PCC control parameters including PCC upper limit 1412 and PCC lower limit 1414, ICM control parameters including ICM upper limit 1416 and ICM lower limit 1418, an operator cruise control set speed 1470, a first projected vehicle speed curve 1420, and a second projected vehicle speed curve 1430.

Projected vehicle speed curve 1420 remains at operator cruise control set speed 1470 until distance 1401 at which point an ICM coasting operation is initiated. From distance 1401 projected vehicle speed curve 1420 decreases as vehicle 100 coasts on a zero road grade until distance 1402 at which point vehicle 100 begins to coast on a downhill grade. From distance 1402 projected vehicle speed curve 1420 increases as vehicle 100 coasts on a downhill grade until distance 1403 at which point the projected vehicle speed curve 1420 hits ICM upper limit 1416 which aborts or terminates the ICM coasting operation. Starting at distance 1403, vehicle speed curve 1420 increases at a reduced rate due to the engagement of the engine with the driveline and reducing acceleration over the downhill until distance 1404 at which point the road grade is zero. From distance 1404 projected vehicle speed curve 1420 decreases due to a zero fueling condition commanded by the control of PCC controls until distance 1405 at which point projected vehicle speed curve 1420 is equal to operator cruise control set speed 1470 and the PCC controls have resumed fueling based on a determination that no variation of the PCC reference speed from operator cruise control set speed 1470 is appropriate.

Projected vehicle speed curve 1430 indicates an opportunity to reduce fuel consumption if ICM upper limit 1416 is increased to or above the magnitude of PCC upper limit 1412. At distance 1403, ICM upper limit 1416 is no longer encountered and projected vehicle speed curve 1430 continues to increase as ICM operation continues during a downhill coast within the bounds of PCC upper limit 1412. At distance 1404, projected vehicle speed curve 1430 begins to decrease as the road grade is zero and a zero fueling condition is commanded by the control of PCC controls. At distance 1406 at which point projected vehicle speed curve 1420 is equal to operator cruise control set speed 1470 and the PCC controls have resumed fueling based on a determination that no variation of the PCC reference speed from operator cruise control set speed 1470 is appropriate.

Figure 15:
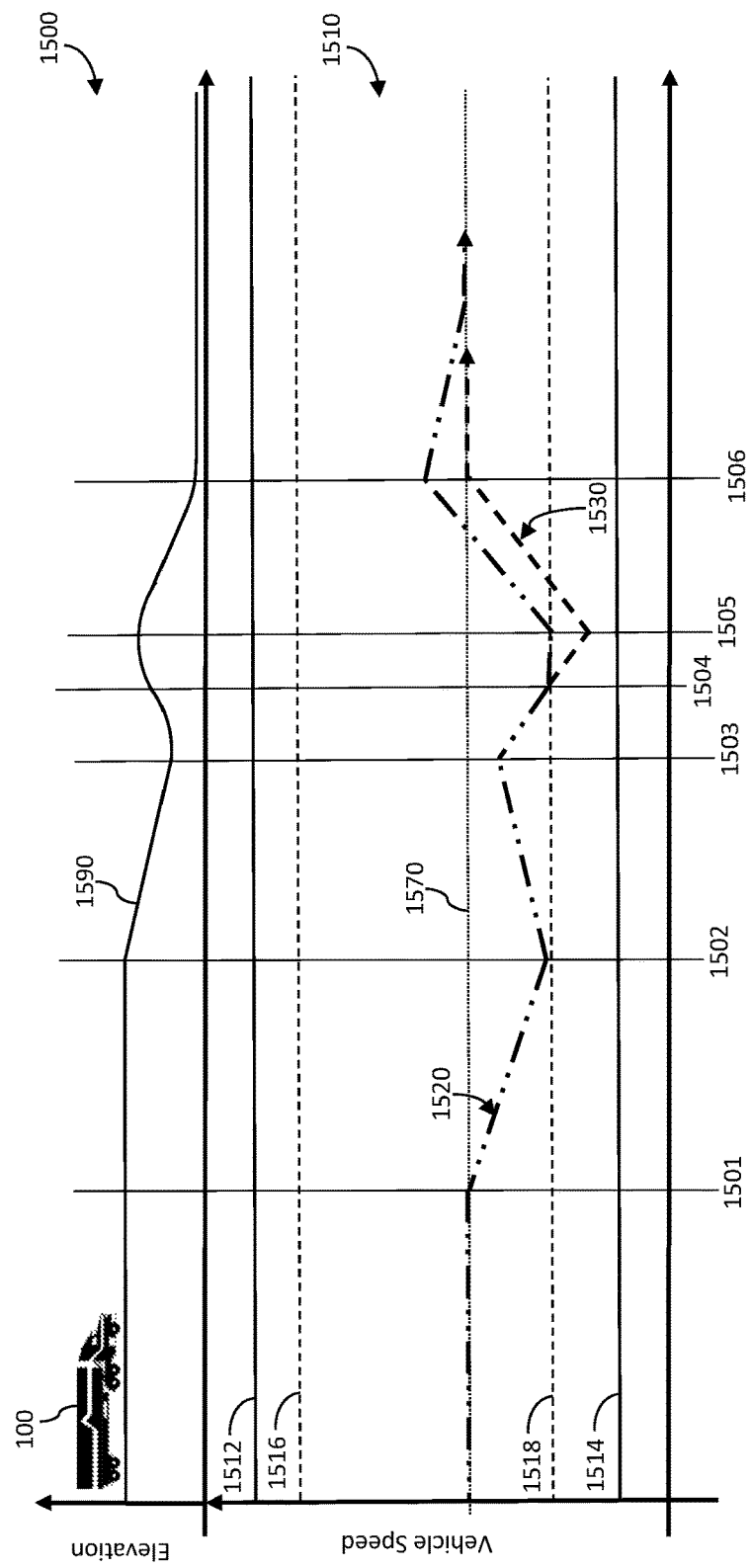
FIG. 15 illustrates graphs depicting elevation versus distance along a vehicle operating horizon, vehicle speed versus distance along the vehicle operating horizon and the interaction of projected vehicle speed curves with ICM and PCC control parameters.

FIG. 15 illustrate a graph 1500 depicting elevation on its vertical axis, distance along a vehicle operating horizon for a vehicle 100 on its horizontal axis and curve 1590 which indicates variation in road grade over the vehicle operating horizon. FIG. 15 also illustrate a graph 1510 depicting vehicle speed on its vertical axis, distance along a vehicle operating horizon on its horizontal axis, PCC control parameters including PCC upper limit 1512 and PCC lower limit 1514, ICM control parameters including ICM upper limit 1516 and ICM lower limit 1518, an operator cruise control set speed 1570, a first projected vehicle speed curve 1520, and a second projected vehicle speed curve 1530.

Projected vehicle speed curve 1520 remains at operator cruise control set speed 1570 until distance 1501 at which point an ICM coasting operation is initiated. From distance 1501 projected vehicle speed curve 1520 decreases as vehicle 100 coasts on a zero road grade until distance 1502 at which point vehicle 100 begins to coast on a downhill grade. From distance 1502 projected vehicle speed curve 1520 increases as vehicle 100 coasts on a downhill grade until distance 1503 at which point the projected vehicle speed curve 1520 begins to decrease as the downhill ends and an uphill road grade is encountered. At distance 1504, vehicle speed curve 1520 has decreased to the point where it hits lower ICM limit 1518 which aborts or terminates ICM coasting operation. From distance 1504 vehicle speed curve remains constant under the control of PCC controls which have commanded fueling to maintain uphill speed until distance 1505 at which point a downhill grade is encountered and predicted vehicle speed curve 1520 increases during downhill acceleration until distance 1506 at which point projected vehicle speed curve 1520 is equal to operator cruise control set speed 1470 and the PCC controls have resumed fueling based on a determination that no variation of the PCC reference speed from operator cruise control set speed 1470 is appropriate.

Projected vehicle speed curve 1530 indicates an opportunity to reduce fuel consumption if ICM lower limit 1518 is decreased to or below the magnitude of PCC lower limit 1514. At distance 1504, ICM lower limit 1518 is no longer encountered and projected vehicle speed curve 1530 continues to decrease as ICM operation continues during an uphill coast within the bounds of PCC lower limit 1514. At distance 1505, projected vehicle speed curve 1530 begins to increase as ICM coasting operation continues over a downhill grade. At distance 1506 at which point projected vehicle speed curve 1530 is equal to operator cruise control set speed 1570 and the PCC controls have resumed fueling based on a determination that no variation of the PCC reference speed from operator cruise control set speed 1570 is appropriate.

Figure 16:
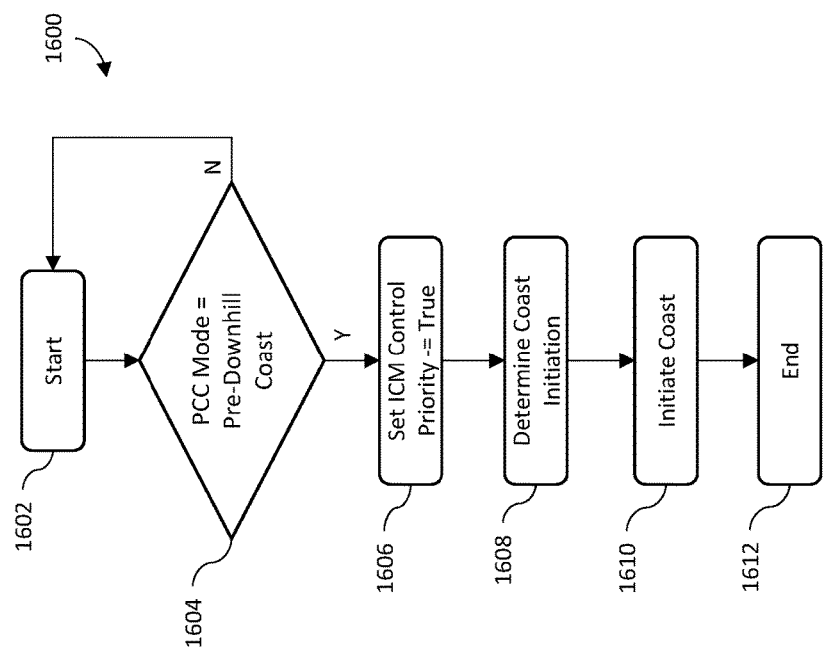
FIG. 16 is a flow diagram illustrating an exemplary control process.

FIG. 16 is a flow diagram of an exemplary control process 1600 providing optimization of concurrent operation of PCC controls and ICM controls. Process 1600 begins at start operator 1602 and proceeds to conditional 1604 which evaluates whether PCC mode equals pre-downhill coast. If conditional 1604 determines that PCC mode equals pre-downhill coast is false, process 1600 proceed to start operator 1602. If condition 1604 determined PCC mode equals pre-downhill coast is true, process 1600 proceeds to operator 1606 which sets ICM control priority to true. Process 1600 proceeds to operator 1608 which determines coast initiation, process 1600 proceed to operator 1610 which initiates coast, process 1600 proceeds to end/repeat operator 1612.

A number of exemplary embodiments shall now be further described. A first exemplary embodiment is a system comprising: a powertrain including a prime mover and an electronically controllable clutch, the powertrain structured to selectably engage the clutch to provide power from the prime mover to drive one or more ground contacting wheels and to selectably disengage the clutch to decouple the one or more ground contacting wheels from the prime mover; an electronic control system in operative communication with the prime mover and the electronically controllable clutch, the electronic control system comprising a predictive cruise control (PCC) controller and an idle coast management (ICM) controller, the electronic control system configured to: operate the PCC controller to control vehicle speed using a PCC speed reference value as a speed target, the PCC speed reference value being initially set in response to operator input and being dynamically varied by the PCC controller in response to at least one of current road grade and look-ahead road grade, operate the ICM controller to control engagement and disengagement of the electronically controllable clutch in response to at least one of current road grade and look-ahead road grade, and during concurrent operation of the PCC controller and the ICM controller, operate the PCC controller to at least one of: in response to an ICM termination event, set the PCC speed reference value using a current vehicle speed, and in response to a downhill coasting operational state, modify the PCC speed reference value to avoid inhibiting operation of the ICM controller.

In certain forms of the first exemplary embodiment the operation of the PCC controller to set the PCC speed reference value using a current vehicle speed comprises setting the PCC speed reference value equal to the current vehicle speed. In certain forms the operation of the PCC controller to modify the PCC speed reference value to avoid to avoid inhibiting operation of the ICM controller comprises setting a PCC ramp rate to a predetermined ramp rate. In certain forms the operation of the PCC controller to modify the PCC speed reference value to avoid inhibiting operation of the ICM controller comprises one of imposing an upper limit on the PCC speed reference value and limiting a rate of change of the PCC speed reference value. In certain forms during concurrent operation of the PCC controller and the ICM controller, the PCC controller is structured to both: in response to the ICM termination event, set the PCC speed reference value using the current vehicle speed, and in response to the downhill coasting operational state, modify the PCC speed reference value to avoid inhibiting operation of the ICM controller. In certain forms the PCC controller and the ICM controller are provided in a common electronic control unit. In certain forms the common electronic control unit is a prime mover control unit.

A second exemplary embodiment is a method comprising: providing a powertrain including a prime mover and an electronically controllable clutch, the powertrain being controllable to engage the clutch to provide power from the prime mover to drive one or more ground contacting wheels and to disengage the clutch to decouple the one or more ground contacting wheels from the prime mover; operating an electronic control system in communication with the prime mover and the electronically controllable clutch, the electronic control system comprising a predictive cruise control (PCC) controller and an idle coast management (ICM) controller, the operation of the electronic control system comprising operating the PCC controller to control vehicle speed using a PCC speed reference value as a speed target, the PCC speed reference value being initially set in response to operator input, the PCC controller dynamically varying the PCC speed reference value in response to at least one of current road grade and look-ahead road grade, operating the ICM controller to engage and disengage the electronically controllable clutch in response to at least one of current road grade and look-ahead road grade, and during concurrent operation of the PCC controller and the ICM controller, operating the PCC controller to at least one of: in response to an ICM termination event, set the PCC speed reference value using a current vehicle speed, and in response to a downhill coasting operational state, modify the PCC speed reference value to avoid inhibiting operation of the ICM controller.

In certain forms of the second exemplary embodiment the act of operating the PCC controller to set the PCC speed reference value using a current vehicle speed comprises setting the PCC speed reference value equal to the current vehicle speed. In certain forms the act of operating the PCC controller to modify the PCC speed reference value to avoid inhibiting operation of the ICM controller comprises setting a PCC ramp rate to a predetermined ramp rate. In certain forms the act of operating the PCC controller to modify the PCC speed reference value to avoid inhibiting operation of the ICM controller comprises at least one of imposing an upper limit on the PCC speed reference value and limiting a rate of change of the PCC speed reference value. In certain forms during concurrent operation of the PCC controller and the ICM controller, the PCC controller performing both: in response to the ICM termination event, sets the PCC speed reference value using the current vehicle speed, and in response to the downhill coasting operating state, modifies the PCC speed reference value to avoid inhibiting operation of the ICM controller. In certain forms the PCC controller and the ICM controller are implemented in a single electronic control unit. In certain forms the single electronic control unit is an engine control unit.

A third exemplary embodiment is an apparatus comprising: a powertrain, including a prime mover and an electronically controllable clutch, wherein the powertrain is configured to selectably engage the clutch from the prime mover with one or more ground contacting wheels and to selectably disengage the clutch from one or more ground contacting wheels, an electronic control system in operative communication with the prime mover and the electronically controllable clutch, the electronic control system comprising a predictive cruise control (PCC) controller and an idle coast management (ICM) controller, the electronic control system being structured to control vehicle with the PCC controller speed using a PCC speed reference value as a speed target, the PCC speed reference value being initially set in response to operator input and being dynamically varied by the PCC controller in response to at least one of current road grade and look-ahead road grade, control engagement and disengagement of the electronically controllable clutch with the ICM controller in response to at least one of current road grade and look-ahead road grade, and during concurrent operation of the PCC controller and the ICM controller, at least one of: in response to an ICM termination event, set the PCC speed reference value using a current vehicle speed, and in response to a downhill coasting operational state, modify the PCC speed reference value to avoid inhibiting operation of the ICM controller.

In certain forms of the third exemplary embodiment the PCC controller is configured to set the PCC speed reference value to a current vehicle speed comprising the PCC speed reference value set to equal the current vehicle speed. In certain forms the PCC controller is configured to modify the PCC speed reference value to avoid inhibiting operation of the ICM controller comprises a PCC ramp rate set to a predetermined ramp rate. In certain forms the PCC controller is configured to modify the PCC speed reference by at least one of imposing an upper limit on the PCC speed reference value and limiting a rate of change of the PCC speed reference value. In certain forms the PCC controller and the ICM controller during concurrent operation are configured to both: set the PCC speed reference value using the current vehicle speed in response to the ICM termination event, and modify the PCC speed reference value to avoid inhibiting operation of the ICM controller in response to the downhill coasting operational state. In certain forms the PCC controller and the ICM controller are provided in two or more electronic control units.

While illustrative embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A system comprising:
  a powertrain including a prime mover and an electronically controllable clutch, the powertrain structured to selectably engage the clutch to provide power from the prime mover to drive one or more ground contacting wheels and to selectably disengage the clutch to decouple the one or more ground contacting wheels from the prime mover;
  an electronic control system in operative communication with the prime mover and the electronically controllable clutch, the electronic control system comprising a predictive cruise control (PCC) controller and an idle coast management (ICM) controller, the electronic control system configured to:
  operate the PCC controller to control vehicle speed using a PCC speed reference value as a speed target, the PCC speed reference value being initially set in response to operator input and being dynamically varied by the PCC controller in response to at least one of current road grade and look-ahead road grade,
  operate the ICM controller to control engagement and disengagement of the electronically controllable clutch in response to at least one of the current road grade and the look-ahead road grade, and
  during concurrent operation of the PCC controller and the ICM controller, operate the PCC controller to at least one of:
  in response to an ICM termination event, set the PCC speed reference value using a current vehicle speed, and
  in response to a downhill coasting operational state, modify the PCC speed reference value to avoid inhibiting operation of the ICM controller.

2. The system of claim 1 wherein the operation of the PCC controller to set the PCC speed reference value using the current vehicle speed comprises setting the PCC speed reference value equal to the current vehicle speed.

3. The system of claim 1 wherein the operation of the PCC controller to modify the PCC speed reference value to avoid inhibiting operation of the ICM controller comprises setting a PCC ramp rate to a predetermined ramp rate.

4. The system of claim 1 wherein the operation of the PCC controller to modify the PCC speed reference value to avoid inhibiting operation of the ICM controller comprises one of imposing an upper limit on the PCC speed reference value and limiting a rate of change of the PCC speed reference value.

5. The system of claim 1 wherein during concurrent operation of the PCC controller and the ICM controller, the PCC controller is structured to both:
  in response to the ICM termination event, set the PCC speed reference value using the current vehicle speed, and
  in response to the downhill coasting operational state, modify the PCC speed reference value to avoid inhibiting operation of the ICM controller.

6. The system of claim 1 wherein the PCC controller and the ICM controller are provided in a common electronic control unit.

7. The system of claim 6 wherein the common electronic control unit is a prime mover control unit.

8. A method comprising:
  providing a powertrain including a prime mover and an electronically controllable clutch, the powertrain being controllable to engage the clutch to provide power from the prime mover to drive one or more ground contacting wheels and to disengage the clutch to decouple the one or more ground contacting wheels from the prime mover;
  operating an electronic control system in communication with the prime mover and the electronically controllable clutch, the electronic control system comprising a predictive cruise control (PCC) controller and an idle coast management (ICM) controller, the operation of the electronic control system comprising
  operating the PCC controller to control vehicle speed using a PCC speed reference value as a speed target, the PCC speed reference value being initially set in response to operator input, the PCC controller dynamically varying the PCC speed reference value in response to at least one of current road grade and look-ahead road grade,
  operating the ICM controller to engage and disengage the electronically controllable clutch in response to at least one of the current road grade and the look-ahead road grade, and
  during concurrent operation of the PCC controller and the ICM controller, operating the PCC controller to at least one of:

in response to an ICM termination event, set the PCC speed reference value using a current vehicle speed, and in response to a downhill coasting operational state, modify the PCC speed reference value to avoid inhibiting operation of the ICM controller.

9. The method of claim 8 wherein the act of operating the PCC controller to set the PCC speed reference value using the current vehicle speed comprises setting the PCC speed reference value equal to the current vehicle speed.

10. The method of claim 8 wherein the act of operating the PCC controller to modify the PCC speed reference value to avoid inhibiting operation of the ICM controller comprises setting a PCC ramp rate to a predetermined ramp rate.

11. The method of claim 8 wherein the act of operating the PCC controller to modify the PCC speed reference value to avoid inhibiting operation of the ICM controller comprises at least one of imposing an upper limit on the PCC speed reference value and limiting a rate of change of the PCC speed reference value.

12. The method of claim 8 wherein during concurrent operation of the PCC controller and the ICM controller, the PCC controller performing both:

in response to the ICM termination event, sets the PCC speed reference value using the current vehicle speed, and in response to the downhill coasting operating state, modifies the PCC speed reference value to avoid inhibiting operation of the ICM controller.

13. The method of claim 8 wherein the PCC controller and the ICM controller are implemented in a single electronic control unit.

14. The method of claim 13 wherein the single electronic control unit is an engine control unit.

15. An apparatus comprising:

a powertrain, including a prime mover and an electronically controllable clutch, wherein the powertrain is configured to selectably engage the clutch from the prime mover with one or more ground contacting wheels and to selectably disengage the clutch from one or more ground contacting wheels, an electronic control system in operative communication with the prime mover and the electronically controllable clutch, the electronic control system comprising a predictive cruise control (PCC) controller and an idle coast management (ICM) controller, the electronic control system being structured to control vehicle speed with the PCC controller using a PCC speed reference value as a speed target, the PCC speed reference value being initially set in response to operator input and being dynamically varied by the PCC controller in response to at least one of current road grade and look-ahead road grade, control engagement and disengagement of the electronically controllable clutch with the ICM controller in response to at least one of the current road grade and the look-ahead road grade, and during concurrent operation of the PCC controller and the ICM controller, at least one of:

in response to an ICM termination event, set the PCC speed reference value using a current vehicle speed, and in response to a downhill coasting operational state, modify the PCC speed reference value to avoid inhibiting operation of the ICM controller.

16. The apparatus of claim 15 wherein the PCC controller is configured to set the PCC speed reference value to the current vehicle speed comprising the PCC speed reference value set to equal the current vehicle speed.

17. The apparatus of claim 15 wherein the PCC controller is configured to modify the PCC speed reference value to avoid inhibiting operation of the ICM controller comprises a PCC ramp rate set to a predetermined ramp rate.

18. The apparatus of claim 15 wherein the PCC controller is configured to modify the PCC speed reference by at least one of imposing an upper limit on the PCC speed reference value and limiting a rate of change of the PCC speed reference value.

19. The apparatus of claim 15 wherein the PCC controller and the ICM controller during concurrent operation are configured to both:

set the PCC speed reference value using the current vehicle speed in response to the ICM termination event, and modify the PCC speed reference value to avoid inhibiting operation of the ICM controller in response to the downhill coasting operational state.

20. The apparatus of claim 15 wherein the PCC controller and the ICM controller are provided in two or more electronic control units.

* * * * *